US012657663B2

(12) United States Patent
Newman

(10) Patent No.: US 12,657,663 B2
(45) Date of Patent: Jun. 16, 2026

(54) SYSTEMS AND METHODS FOR COMBINING MULTIPLE DEPTH MAPS

(71) Applicant: Visionary Machines Pty Ltd, Hornsby (AU)

(72) Inventor: Rhys Newman, Hornsby (AU)

(73) Assignee: Visionary Machines Pty Ltd, Sydney (AU)

(*) Notice: Subject to any disclaimer, the term of this patent is extended or adjusted under 35 U.S.C. 154(b) by 257 days.

(21) Appl. No.: 18/274,908

(22) PCT Filed: Jan. 28, 2022

(86) PCT No.: PCT/IB2022/050773
§ 371 (c)(1),
(2) Date: Jul. 28, 2023

(87) PCT Pub. No.: WO2022/162616
PCT Pub. Date: Aug. 4, 2022

(65) Prior Publication Data
US 2024/0087094 A1      Mar. 14, 2024

(30) Foreign Application Priority Data

Jan. 28, 2021    (AU) ................................. 2021900183

(51) Int. Cl.
*G06T 5/50*          (2006.01)
*G01B 11/22*          (2006.01)
(Continued)

(52) U.S. Cl.
CPC ................ *G06T 5/50* (2013.01); *G01B 11/22* (2013.01); *G06T 7/593* (2017.01); *H04N 13/243* (2018.05);
(Continued)

(58) Field of Classification Search
CPC . G06T 5/50; G06T 7/593; G06T 2207/10028; G06T 2207/20221; H04N 13/271; H04N 13/243; G01B 11/22
See application file for complete search history.

(56) References Cited

U.S. PATENT DOCUMENTS 6,307,959 B1    10/2001   Mandelbaum et al.
8,081,244 B2    12/2011   Golub et al.
(Continued)

FOREIGN PATENT DOCUMENTS

JP          3561446 B2      6/2004
JP      2011149952 A      8/2011
WO      2019116942 A1      6/2019

OTHER PUBLICATIONS

EP22745483.2 , "Extended European Search Report", Nov. 25, 2024, 10 pages.
(Continued)

*Primary Examiner* — Gregory M Desire
(74) *Attorney, Agent, or Firm* — Kilpatrick Townsend & Stockton LLP

(57)          ABSTRACT

Certain embodiments of the present disclosure are relating to devices, systems and/or methods that may be used for determining scene information using depth information obtained from more than one point of view and combining that depth information to improve the accuracy of the scene information.

21 Claims, 8 Drawing Sheets

(51) Int. Cl.
　　*G06T 7/593*　　(2017.01)
　　*H04N 13/243*　　(2018.01)
　　*H04N 13/271*　　(2018.01)

(52) U.S. Cl.
　　CPC . *H04N 13/271* (2018.05); *G06T 2207/10028* (2013.01); *G06T 2207/20221* (2013.01)

(56) References Cited

U.S. PATENT DOCUMENTS

| | | | |
|---|---|---|---|
| 8,922,636 B1 | 12/2014 | Belden et al. | |
| 9,473,762 B2 * | 10/2016 | Zierke | H04N 13/282 |
| 10,404,961 B2 * | 9/2019 | Chan | G06T 19/00 |
| 10,445,861 B2 * | 10/2019 | Siddiqui | G06T 5/70 |
| 10,957,067 B2 * | 3/2021 | Yoshikawa | G06T 7/80 |
| 11,094,075 B1 * | 8/2021 | Lanman | G06N 3/0455 |
| 11,120,567 B2 * | 9/2021 | Lee | H04N 23/698 |
| 11,430,086 B2 * | 8/2022 | Bleyer | H04N 13/271 |
| 11,461,912 B2 * | 10/2022 | Matthies | G06T 7/579 |
| 12,026,903 B2 * | 7/2024 | Varekamp | G06T 5/50 |
| 2001/0005204 A1 | 6/2001 | Matsumoto et al. | |
| 2002/0015048 A1 | 2/2002 | Nister | |
| 2012/0013749 A1 | 1/2012 | Oberdoerster et al. | |
| 2012/0056982 A1 | 3/2012 | Katz et al. | |
| 2012/0163672 A1 | 6/2012 | McKinnon | |
| 2014/0092217 A1 | 4/2014 | Tanner | |
| 2014/0205270 A1 | 7/2014 | Kelly et al. | |
| 2014/0321712 A1 | 10/2014 | Ciurea et al. | |
| 2015/0049915 A1 | 2/2015 | Ciurea et al. | |
| 2015/0116597 A1 | 4/2015 | Chandraker et al. | |
| 2016/0203373 A1 | 7/2016 | Menashe et al. | |
| 2016/0212411 A1 | 7/2016 | Lindner et al. | |
| 2017/0337703 A1 | 11/2017 | Wu et al. | |
| 2018/0180733 A1 | 6/2018 | Smits | |
| 2019/0311546 A1 | 10/2019 | Tay et al. | |
| 2020/0213527 A1 | 7/2020 | Bleyer et al. | |

OTHER PUBLICATIONS

PCT/IB2022/050773 , "International Preliminary Report on Patentability", Aug. 10, 2023, 7 pages.

PCT/IB2022/050773 , "International Search Report and Written Opinion", Apr. 27, 2022, 11 pages.

International-type Search for Provisional Patent Application AU 2019904127, prepared by IP Australia; Jan. 1, 2020.

International-type Search for Provisional Patent Application AU 2020901307, prepared by IP Australia; Jun. 9, 2020.

* cited by examiner

601

610

611

612

D = 4.8

602

620

621

622

D = 4.8
RGB = {100, 140, 54}

603

630

631

632

633

634

635

604

635

| 4.5 | 5.7 | 4.6 | 4.9 | 4.6 | 5.0 | 5.2 |

SYSTEMS AND METHODS FOR COMBINING MULTIPLE DEPTH MAPS

RELATED APPLICATIONS

This application is a U.S. National Phase of International Application No. PCT/IB2022/050773, filed Jan. 28, 2022, claiming priority to Australian Provisional Patent Application No. 2021900183, filed Jan. 28, 2021, contents of which are hereby incorporated by reference in their entirety.

TECHNICAL FIELD

The present disclosure relates generally to devices, systems and/or methods that may be used for determining scene information using data obtained at least in part from more than one point of view.

BACKGROUND ART

Scene information about the 3D environment is useful for many applications including, for example, the safe autonomous driving of vehicles on conventional roads and highways, and for example for navigation, surveying, environmental monitoring, crop monitoring, mine surveying, surveillance of a perimeter, and checking the integrity of built structures. For example, there is a need to measure full 3D positions of objects and surfaces in a scene so that a moving vehicle may avoid collisions. With angular positions conveniently measured by conventional cameras (from which captured images reveal the "X" and "Y" components of an object or surface's position), the challenge is to accurately and reliably measure the object or surface's depth (or "Z" distance) away from the vehicle.

One way of creating such scene information is with devices that use one or more lasers, potentially strobing to cover a scene, to emit pulses of light and by measuring the time delay to receive reflected pulses determine the distances of surfaces in the 3D scene from the laser source—such devices are commonly termed LiDAR. LiDAR may provide accurate range measurements; however, the angular resolution may be limited.

Another way to capture 3D scene information is to use radar; however, radar has typically significantly lower resolution than LiDAR Optical camera systems may be used, with appropriate processing, to generate 3D scene information. Binocular cameras, capturing pairs of images may be used to derive 3D scene information, based on binocular disparity (i.e., the difference between the positions in two images of a fixed feature in the scene). Typically, binocular disparity methods match local regions in image pairs captured by cameras that have a known physical separation or baseline. From the disparity, a depth for the matched region may be determined based on optical (the assumption that light travels in straight lines) and geometric triangulation principles. Binocular disparity methods are prone to error in plain regions where there is little or no texture for identifying accurate matches between the two separate views. Binocular disparity methods also suffer from ambiguity around objects whose parts are occluded from one or both cameras.

Optical camera systems, using more than two cameras in concert to view a scene from different positions, are known in the art; these systems are often simply referred to as camera arrays. These arrays capture a set of 2D images of the scene from multiple different directions and/or positions. Depth information may then be obtained using similar principles to the binocular camera, based on the disparity of local image regions matched between pairs of images from different cameras in the camera array.

Depth maps, produced from whatever sensor and/or computational methodology, may contain small errors and may also contain a number of substantial errors (for example, due to occlusions between objects in a typical 3D scene).

The present disclosure is directed to overcome and/or ameliorate at least one or more of the disadvantages of the prior art, as will become apparent from the discussion herein. The present disclosure also provides other advantages and/or improvements as discussed herein.

SUMMARY OF DISCLOSURE

This summary is not intended to be limiting as to the embodiments disclosed herein and other embodiments are disclosed in this specification. In addition, limitations of one embodiment may be combined with limitations of other embodiments to form additional embodiments.

Certain embodiments are directed to a method of combining depth information collected from at least two source depth maps to produce refined depth information comprising:

a. providing at least two source depth maps of a scene from at least two points of view and forwarding the provided at least two source depth maps to a computer system configured to:
b. receive the at least two source depth maps;
c. select a target viewpoint in order to generate a target depth map;
d. select at least a first selected location on the target depth map, and locate corresponding locations and depth values in at least two of the source depth maps and by using zero or at least one of the corresponding depth values to determine at least one refined depth value for the first selected location; and
e. repeat the process in step (d) for at least a substantial portion of locations in the target depth map to determine refined depth values for at least the substantial portion of locations to produce the refined depth information.

Certain embodiments are directed to a method of combining depth information from at least two depth maps to produce refined depth information comprising:

a. providing at least two source depth maps of a scene from at least two points of view and forwarding the collected at least two source depth maps to a computer system configured to:
b. receive the at least two source depth maps;
c. select a target viewpoint in order to generate a target depth map;
d. select at least a first selected location on the target depth map, and locate corresponding locations and depth values in at least one of the at least two source depth maps and by using zero or at least one of the corresponding depth values determine at least one refined depth value for the first selected location;
e. repeat the process in step (d) for at least a substantial portion of locations in the target depth map to determine refined depth values for at least the substantial portion of locations in the target depth map;
f. repeat steps (c), (d), and (e) to produce at least two refined target depth maps;
g. repeat steps (b), (c), (d), (e), and (f) using the at least two refined target depth maps as the at least two source depth maps;

h. repeat step (g) until a termination condition is reached; and i. output the refined depth information representative of the scene.

Certain embodiments are directed to a method of combining depth information collected from at least two depth sensors to produce refined depth information comprising:

a. generating at least two source depth maps of a scene from at least two points of view from the at least two depth sensors and forwarding the collected at least two source depth maps to a computer system configured to:

b. receive the at least two source depth maps;

c. select a target viewpoint in order to generate a target depth map;

d. select at least a first selected location on the target depth map, and locate corresponding locations and depth values in at least two of the source depth maps and by using zero or at least one of the corresponding depth values to determine at least one refined depth value for the first selected location; and e. repeat the process in step (d) for at least a substantial portion of locations in the target depth map to determine refined depth values for at least the substantial portion of locations to produce the refined depth information.

Certain embodiments are directed to a method of combining depth information collected from at least two depth sensors to produce refined depth information comprising:

a. generating at least two source depth maps of a scene from at least two points of view from the at least two depth sensors and forwarding the collected at least two source depth maps to a computer system configured to:

b. receive the at least two source depth maps;

c. select a target viewpoint in order to generate a target depth map;

d. select at least a first selected location on the target depth map, and locate corresponding locations and depth values in at least one of the at least two source depth maps and by using zero or at least one of the corresponding depth values determine at least one refined depth value for the first selected location;

e. repeating the process in step (d) for at least a substantial portion of locations in the target depth map to determine refined depth values for at least the substantial portion of locations in the target depth map;

f. repeat steps (c), (d), and (e) to produce at least two refined target depth maps;

g. repeat steps (b), (c), (d), (e), and (f) using the at least two refined target depth maps as the at least two source depth maps to further improve the accuracy of the at least two refined target depth maps;

h. repeat step (g) until a termination condition is reached; and i. output the refined depth information representative of the scene.

Certain embodiments are directed to a method of combining depth information collected from a plurality of sensors comprising:

a. collecting a plurality of depth data values from the plurality of sensors and sending the plurality of depth data values to a processor, wherein the plurality of depth data values comprises at least a first source input depth data value from at least a first depth sensor and at least a second source input depth data value from at least a second depth sensor;

b. projecting the at least first source input depth data value from at least a first input depth sensor to a corresponding first location in at least one other target depth sensor and determining at least a first target sample depth value;

c. projecting the at least second source input depth data value from at least a second input depth sensor to a corresponding second location in the at least one other target depth sensor and determining at least a second target sample depth value;

d. examining a portion of projected values in the at least one other target depth map on a per-location basis determining at least one refined depth value for a substantial portion of examined locations;

e. repeating steps (b), (c), and (d) for more than one location on the at least one other target depth map;

f. repeating step (e) for multiple target depth maps; and generating improved depths maps for at least some of these target viewpoints.

Certain embodiments are directed to a method for combining one or more depth maps, supplied by one or more depth map sensors, comprising:

a. accepting a set of source depth maps supplied by two or more depth map sensors;

b. selecting a target viewpoint in order to generate a target depth map;

c. transforming a substantial portion of depth measurements of at least two source depth maps to generate at least two corresponding transformed depth maps from the at least two source depth maps data with viewpoints substantially aligned with the target viewpoint; and d. determining at least one representative depth value for at least a first selected location on at least one target depth map by locating corresponding locations and depths in the at least two corresponding transformed depth maps and using that depth map data to determine the at least one representative depth value; and e. producing a more refined depth map by repeating step d for a substantial portion of locations on the at least one target depth map.

Certain embodiments are directed to a method for combining one or more depth maps, supplied by one or more depth map sensors, comprising:

a. accepting a set of source depth maps supplied by two or more depth map sensors;

b. selecting a target viewpoint in order to generate a target depth map;

c. transforming a substantial portion of depth measurements of at least two source depth maps to generate a viewpoint substantially aligned with a target viewpoint;

d. select at least a first selected location on the target depth map, and locate corresponding locations and depth values in at least two of the source depth maps and by using zero or at least one of the corresponding depth values to determine at least one refined depth value for the first selected location; and e. repeating steps (b), (c), and (d) on a plurality of target viewpoints to generate a plurality of more refined depth maps;

f. repeating step (e) on the plurality of more refined depth maps at least one more time, wherein the plurality of more refined depth maps is treated as a plurality of source depth maps to further improve the accuracy, quality, or combinations thereof;

g. terminating the repeating of step (f) when a termination condition is reached; and h. generating one or more of the following: a set of final depth maps and at least one point cloud that represents projections of the set of final depth maps into a scene.

Certain embodiments are directed to a system that is configured to combine one or more depth maps, comprising:

a. a set of at least two source depth maps;

b. a computer system that is configured to:

c. accept a set of the at least source depth maps;

d. select a target viewpoint in order to generate a target depth map;

e. transform a substantial portion of depth measurements of the at least two source depth maps to generate first source input depth data; and f. select at least a first selected location on the target depth map, and locate corresponding locations and depth values in the at least two source depth maps and by using zero or at least one of the corresponding depth values to determine at least one refined depth value for the first selected location.

Certain embodiments are directed to a system that is configured to combine one or more depth maps, comprising:

a. a set of at least two source depth maps;

b. a computer system that is configured to:

c. accept a set of at least two source depth maps;

d. select a target viewpoint in order to generate a target depth map;

e. collect a substantial portion of depth measurements of the at least two source depth maps to generate first source input depth data;

f. select at least a first selected location on the target depth map, and locate corresponding locations and depth values in the at least two source depth maps and by using zero or at least one of the corresponding depth values to determine at least one refined depth value for the first selected location; and;

g. repeat steps (d), (e), and (f) on a plurality of target viewpoints to generate a plurality of more refined depth maps;

h. repeat step (g) on the plurality of more refined depth maps at least one more time, wherein the plurality of more refined depth maps is treated as a plurality of source depth maps to further improve the accuracy, density, quality, or combinations thereof; and i. terminate the repeating of step (h) when a termination condition is reached.

Certain embodiments are directed to a system that is configured to combine one or more depth maps, comprising:

a. one or more depth map sensors, the one or more depth map sensors are configured to generate a set of source depth maps supplied by two or more depth map sensors;

b. a computer system that is configured to:

c. accept a set of source depth maps supplied by two or more depth map sensors;

d. select a target viewpoint in order to generate a target depth map;

e. collect a substantial portion of depth measurements of at least two source depth maps to generate first source input depth data; and f. select at least a first selected location on the target depth map, and locate corresponding locations and depth values in at least two of the source depth maps and by using zero or at least one of the corresponding depth values to determine at least one refined depth value for the first selected location.

Certain embodiments are directed to a system that is configured to combine one or more depth maps, comprising:

a. one or more depth map sensors, the one or more depth map sensors are configured to generate a set of source depth maps supplied by two or more depth map sensors;

b. a computer system that is configured to:

c. accept a set of source depth maps supplied by two or more depth map sensors;

d. select a target viewpoint in order to generate a target depth map;

e. collect a substantial portion of depth measurements of at least two source depth maps to generate first source input depth data;

f. select at least a first selected location on the target depth map, and locate corresponding locations and depth values in at least two of the source depth maps and by using zero or at least one of the corresponding depth values to determine at least one refined depth value for the first selected location; and;

g. repeat steps (d), (e) and (f) on a plurality of target viewpoints to generate a plurality of more refined depth maps;

h. repeat step (g) on the plurality of more refined depth maps at least one more time, wherein the plurality of more refined depth maps is treated as a plurality of source depth maps to further improve the accuracy, density, quality, or combinations thereof; and i. terminate the repeating of step (h) when a termination condition is reached.

Certain embodiments are directed to a method of combining depth information collected from at least two depth sensors comprising:

a. generating at least two source depth maps of a scene from at least two points of view from the at least two depth sensors and forwarding the collected at least two source depth maps to a computer system configured to:

b. receive the at least two source depth maps;

c. project the collected at least two source depth maps into a point cloud;

d. project at a least a portion of the point cloud onto at least one target depth map and for a first selected location on the at least one target depth map locate corresponding points from the point cloud that projects to the first selected location in the at least one target depth map and by using the depth measurements of the corresponding points determine at least one refined depth value for the first selected location on the target depth map; and e. repeat the process in step d for at least a substantial portion of locations in the at least one target depth map to determine refined depth values for at least the substantial portion of locations and generate at least one further refined target depth map.

Certain embodiments are directed to a method of combining depth information collected from at least two depth sensors comprising:

a. generating at least two source depth maps of a scene from at least two points of view from the at least two depth sensors and forwarding the collected at least two source depth maps to a computer system configured to:

b. receive the at least two source depth maps;

c. project the collected at least two source depth maps into a point cloud;

d. project at a least a portion of the point cloud onto at least one target depth map and for a first selected location on the at least one target depth map locate corresponding points from the point cloud that projects to the first selected location in the at least one target depth map and by using the depth measurements of the corresponding points determine at least one refined depth value for the first selected location on the target depth map;

e. repeat the process in step d for at least a substantial portion of locations in the at least one target depth map to determine refined depth values for at least the substantial portion of locations and generate at least one further refined target depth map;

f. repeat steps (b), (c), (d) and (e) to further improve the accuracy of the refined depth values and terminate the repeating of steps b, c, d and e when a termination condition is reached; and g. generate at least two further refined depth map comprising refined depth information; and optionally, the refined depth information contained in the at least one further refined depth map is used to generate a scene point cloud that is representative of the scene.

DETAILED DESCRIPTION

Figure 1:
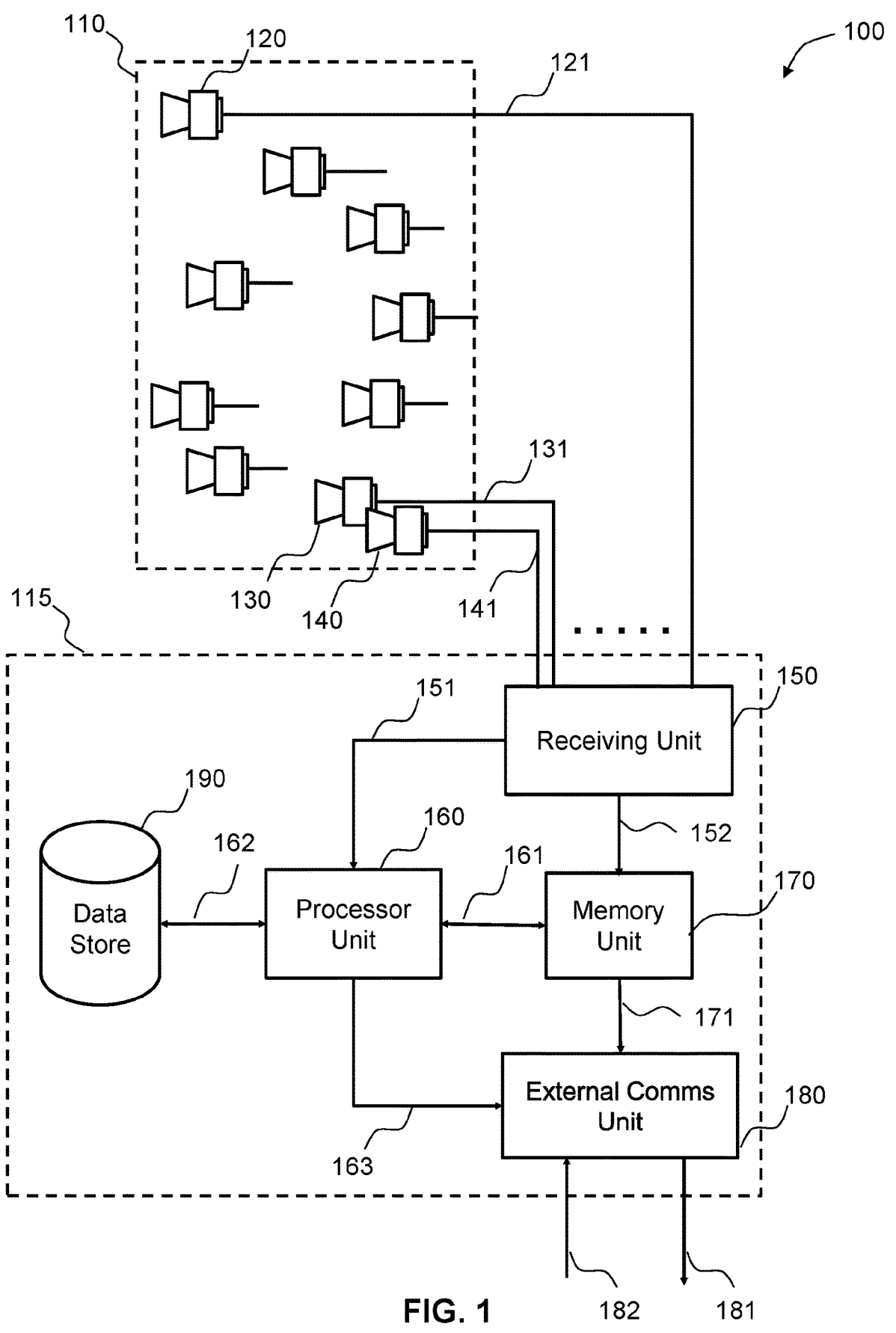
FIG. 1 is a top-level system diagram for creating a 3-dimensional representation of a scene, including a sensor array and a computer system, according to certain embodiments.

The subject headings used in the detailed description are included only for the ease of reference of the reader and should not be used to limit the subject matter found throughout the disclosure or the claims. The subject headings should not be used in construing the scope of the claims or the claim limitations.

Certain embodiments of this disclosure may be useful in several areas. For example, one or more of the following non-limiting exemplary applications: off-road vehicle (e.g., cars, buses, motorcycles, trucks, tractors, forklifts, cranes, backhoes, bulldozers); road vehicles (e.g. cars, buses, motorcycles, trucks); rail based vehicles (e.g., locomotives); air based vehicles (e.g., airplanes, helicopters); individuals (e.g., miners, soldiers, pilots, war fighters, emergency workers, maintenance workers, rescuers), amphibious vehicles (e.g., boats, cars, buses); and watercraft (e.g., ships boats, hovercraft, submarines). In addition, the non-limiting exemplary applications may be operator driven, semi-autonomous and/or autonomous.

Certain embodiments of this disclosure may be useful in several further areas. For example, one or more of the following non-limiting exemplary applications: mapping the environment, surveying the environment or building 3D models of the environment (where the environment may include for example: streets, pathways, houses, buildings, tunnels, mines, built environment, farmland, forests, fields, formations, or natural environment); and 3D modelling of other types of objects (e.g., people, animals, artefacts, art works, manufacturing samples, prototypes, etc.).

The term "scene" means a subset of the three dimensional real-world (i.e., 3D physical reality) as perceived through the field of view of one or more sensors. In certain embodiments, there may be at least 2, 3, 4, 5, 10, 15, 20, 25, 30, 35 or 40, 100, 1000, or more sensors.

The term "object" means an element in a scene. For example, a scene may include one or more of the following objects: a person, a child, a car, a truck, a crane, a mining truck, a bus, a train, a motorcycle, a wheel, a patch of grass, a bush, a tree, a branch, a leaf, a rock, a hill, a cliff, a river, a road, a marking on the road, a depression in a road surface, a snow flake, a house, an office building, an industrial building, a tower, a bridge, an aqueduct, a bird, a flying bird, a runway, an airplane, a helicopter, door, a door knob, a shelf, a storage rack, a fork lift, a box, a building, an airfield, a town or city, a river, a mountain range, a field, a jungle, and a container. An object may be a moving element in the scene, or may be stationary or substantially stationary. An object may be considered to be in the background or foreground of the scene.

The term "physical surface" means the surface of an object in a scene that emits and/or reflects electromagnetic radiation in at least one portion of the electromagnetic spectrum and where at least a portion of such radiation travels across at least a portion of the scene.

The term "3D point" or "3D coordinates" means a representation of the location of a point in the scene defined at least in part by at least three parameters that indicate distance in three dimensions from an origin reference to the point, for example, in three directions from the origin where the directions may be substantially perpendicular (at least not co-planar or co-linear), or as an alternative example using a spherical coordinate system consisting of a radial distance, a polar angle, and an azimuthal angle.

The term "3D neighbourhood" or "neighbourhood" means a 3D volume in the scene whose maximum linear extent in one or more directions may be limited to be less than a specified threshold. That threshold, which may be different for different directions, may be, for example, 0.1 mm, 1 mm, 5 mm, 1 cm, 5 cm, 10 cm, 50 cm, 1 m, 5 m, 10 m, 50 m, 100 m, or other value of appropriate scale when considering the overall size of the physical space represented by the scene. A 3D neighbourhood may be considered to contain one or more 3D points if the coordinates of those 3D points lie within the 3D volume described by that 3D neighbourhood.

The terms "3D scene information", "3D information" or "scene information" means information about one or more 3D neighbourhoods in the scene during a relatively static time period. The information may include one or more of the following: i) a characteristic location of the one or more 3D neighbourhoods (e.g., the arithmetic or geometric centroid of the 3D points contained in the one or more 3D neighbourhoods); ii) the spectral information of one or more 3D points, objects, or surfaces at least partially contained in the one or more 3D neighbourhoods from the viewpoint of one or more sensors; and iii) metadata that describe(s), at least in part, the 3D points, objects or surfaces at least partially contained in the one or more 3D neighbourhoods. The metadata may include one or more of the following properties: the texture of the 3D points; spectral data from a region near the 3D points; the instantaneous velocities of one or more 3D points in one, two, or three dimensions (also allowing for one or more summarized velocity values such as the average velocity of the 3D points in one, two, or three dimensions); the type or classification of an object or surface wholly or partially present in the one or more 3D neighbourhoods; and potentially other data.

The term "sensor centre" or "sensor viewpoint" is the 3D point from which distances to objects and/or surfaces in the scene are reported by a particular 3D depth sensor. For a single, standard camera (a simple sensor that does not measure depth without additional enhancements), the sensor centre may be the "camera centre"; a fundamental component of the idealised "pin-hole" camera model that is well known in the art. For a LIDAR unit the centre may be the origin of the laser source that is strobing the scene (the lasers are often mounted so they rotate around this centre point).

The term "relatively static time period" means a period of time in which the substantial majority of the physical surfaces in a scene are at least substantially stationary relative to the sensor. As used with respect to this term, the period of time may be about 0.0001 seconds, 0.01 seconds, 0.05 seconds, 0.1 seconds, 0.2 seconds, 1 second, or 10 seconds. As used with respect to this term, the period of time may be less than 0.0001 seconds, 0.01 seconds, 0.05 seconds, 0.1 seconds, 0.2 seconds, 1 second, 10 seconds or longer if appropriate to the situation. As used with respect to this term, the period of time may be between 0.0001 seconds and 10 seconds, 0.0001 seconds and 0.01 seconds, 0.01 seconds and 1 second, 0.05 seconds and 5 seconds, 0.1 seconds and 1 second, 0.2 seconds and 2 seconds, 1 second and 4 seconds, or 0.1 seconds and 10 seconds, or larger ranges as appropriate to the situation. As used with respect to this term, the period may be 1 minute, 10 minutes, 100 minutes or longer as appropriate in certain applications, for example, when distances in the scene and/or speeds of objects or cameras are large enough (for example, in satellite and/or space-based applications). As used with respect to this term, the substantial majority may be at least 60%, 70%, 80%, 85%, 90%, 95%, 99% or 100% of the physical surfaces in the scene. As used with respect to this term, the phrase "substantially stationary" means the physical surfaces' movements relative to the sensor may be less than 0.1%, 0.2%, 0.5%, 1%, 2%, 5%, or 10% of their positions relative to the sensor, or greater if appropriate to the situation.

The term "depth map" means a representation of a plurality of depths of physical surfaces in a scene from a specified reference location. In some embodiments this reference location may be an actual or nominal sensor centre. In certain embodiments, the depth map may be represented by a two dimensional grid comprising a plurality of cells, wherein at least a portion of the plurality of cells in this grid hold or store, for at least one time instant, a plurality of depth information and the plurality of depth information may represent various distances to one or more physical surfaces in a scene from the sensor centre. In certain embodiments, the plurality of cells may be arranged in a non-grid like arrangement, for example, circle, spiral, cylinder, etc. In certain embodiments, depth maps may originate from sensors, for example, LIDAR, radar, Sonar, Time-of-flight cameras, Stereo Cameras, multi-stereo camera array systems, or combinations thereof.

The term "depth map location" means the address, in two dimensions, of a cell in which a depth map may store depth information for at least one time instant; for example, a depth value that represents an estimate of distance along a substantially straight line from the respective sensor centre, to a surface in a scene. In some embodiments, the cells may be arranged in a substantially rectangular two-dimensional grid, in which case the depth map location would be a cell's two dimensional grid location. In some embodiments, one or more depth map cells may have depth information indicating that there is no valid depth value or no depth information.

The term "refined depth values" means a set of measurements of depths, from an actual or nominal sensor centre to physical surfaces of objects in the scene, that may be more accurate or complete than at least a substantial subset of the original or unrefined set of depth measurements from which they are at least in part derived.

The term "refined depth map" means a collection of refined depth values sufficient to map at least a portion of a scene.

The term "neighbouring cells" means cells in a depth map located adjacent to, or which have depth map locations within a specified distance from, each other. In certain embodiments, the specified distance may be less than 0.001 mm, 0.01 mm, 0.1 mm, 1 mm, 10 mm, 100 mm or 1000 mm.

The term "robust statistics" means mathematical or computational techniques that may be able to generate one or more refined values from a set of supplied values, wherein the variability within the supplied values, if any, is at least in part due to noise processes that may not conform to a probability distribution with known parameterisation or may conform to a probability distribution with known parameterisation. Examples of a robust statistic include, but are not limited to, the median, trimmed median, weighted median, bootstrapped median, trimmed mean, other technique known in the art, or combinations thereof.

The term "point cloud" means a set of 3D points that collectively represent an approximation to physical surfaces or objects in a scene. The 3D points in the point cloud may additionally have other data associated with them, for example spectral data, optical flow data, and/or other metadata. A point cloud may be converted to a depth map, as may be produced by a depth sensor, by projecting one or more 3D points in the cloud along a line directed to the actual or nominal sensor centre (in 3D) and thereby onto the sensor's actual or nominal two-dimensional imaging surface, plane or grid. A depth map may be converted to a point cloud by projecting at least a portion of the depth values in the depth map into 3D space along substantially straight lines from the maps' associated reference location, through the corresponding depth map locations, to the distances specified by the corresponding depth map values.

The term "each" as used herein means that at least 95%, 96%, 97%, 98%, 99% or 100% of the items or functions referred to perform as indicated.

Exemplary items or functions include, but are not limited to, one or more of the following: location(s), image pair(s), cell(s), pixel(s), pixel location(s), layer(s), element(s), point(s), neighbourhood(s), 3D neighbourhood(s), and 3D point(s).

The term "at least a substantial portion" as used herein means that at least 60%, 70%, 80%, 85%, 95%, 96%, 97%, 98%, 99%, 01100% of the items or functions referred to. Exemplary items or functions include, but are not limited to, one or more of the following: location(s), image pair(s), cell(s), pixels(s), pixel location(s), layer(s), element(s), point(s), neighbourhood(s), 3D neighbourhood(s), and 3D point(s).

Certain Exemplary Advantages

In addition to other advantages disclosed herein, one or more of the following advantages may be present in certain exemplary embodiments:

One advantage may be that an accurate 3D scene information stream produced from the depth map combination techniques herein described may be calculated at real time sample rates, or substantially real time sample rates, to enable navigation decisions by higher level systems. Examples of such navigation decisions include, but are not limited to, trajectory selection, collision avoidance, road following, driving risk assessment, safe speed determination, driver assistance, driver alerts, safe distance following, personal space navigation, or combinations thereof.

Another advantage may be that an 3D scene information produced from the depth map combination techniques herein described may be have reduced errors. For example, they may determine depth with radial accuracy and/or angular accuracy higher than possible with any single sensor used in isolation.

Another advantage may be that an 3D scene information produced from the depth map combination techniques herein described may overcome partial occlusion. For example, where a foreground object obstructs the view of some parts of the scene from some of the sensors.

Another advantage of may be that the depth is determined with better fidelity around boundaries of objects, for example foreground objects, overlapping objects, objects with rounded boundaries.

Another advantage may be that depth maps from different sensor types, such as standard RGB cameras, infrared cameras, time-of-flight cameras, Lidars or radars may be combined to form more accurate and/or complete information about a 3D scene than would be possible with each sensor taken separately.

System Diagram

FIG. 1 shows a system diagram 100 of certain exemplary embodiments. The system includes a sensor array 110 and a computer system 115.

The sensor array 110 includes a set of depth sensors in a selected configuration (examples of configurations of depth sensors are provided elsewhere in this disclosure). The depth sensors, 120, 130, 140 are described in detail herein.

In certain embodiments, the sensors array consists of a single type of depth sensor (e.g., ToF camera, lidar, radar). In certain embodiments, the sensor array consists a mixture of different types of depth sensor (e.g., RGB camera stereo pairs, near infrared camera stereo pairs, long-wave infrared stereo or multi-stereo sensor, lidar, radar). In certain embodiments, the sensor array may include related circuitry to ensure synchronised capture of data from a portion, a substantial portion or all of the depth sensors 110.

The computer system 115 includes a receiving unit 150 for communication with the depth sensors in the sensor array 110. The receiving unit is connected via communication bus 151 with the processor unit 160, and a memory unit 170. The processor unit 160 may be a general-purpose CPU or GPU or may be customised hardware such as an FPGA or ASIC designed to perform the required processing. The memory unit 170 may include volatile and/or non-volatile memory. It may store instructions for the processing unit 160 as well as image data received from the receiving unit 160 via the communications bus 152. The processing unit 160 may also be connected to a data store 190 via communications bus 162. The processing unit 160 may also be connected to (or in communication with) an external communications unit 180 via 163. The communications unit 180 may be used to output a 3D data stream for the use of external systems. The communications unit 180 may also receive data from external sources including position data, map data and/or previously recorded 3D data regarding the scene.

Depth sensors in the sensor array 110 may be connected to the computer system 115. Depth sensors have a communication channel indicated by 121, 131, 141 to accept control and/or synchronisation signals and to output depth data. Synchronous capture of images, point clouds, depth maps or other data from sensors in the depth sensor array 110 may be useful and may be enabled by the communication channel 121, 131, 141.

The computer system 115 may receive and may process data from depth sensors in the sensor array 110 to produce a number of depth maps. Some depth sensors, such as time-of-flight cameras may produce a depth map directly. Some depth sensors, such as LI DAR, may produce depth information as a point cloud, a series of 3D points set about the sensor, which may then be transformed into a depth map by projecting the 3D points towards the sensor centre and onto an assumed conceptual imaging plane in a manner similar to the idealised pin-hole camera model that is known in the art. Some depth sensors, such as stereo camera pairs, may produce depth maps generated though the principle of image stereo disparity. The techniques for producing depth maps from stereo camera pairs are known in the art and will not be described further.

The computer system 115 may store the depth maps in memory unit 170. The computer system may perform a depth map combining process to produce a combined depth map with other features, for example, reduced noise, improved accuracy, improved determination of depth about the edges of objects, combinations thereof and so on. A depth map combining process will be described later in this disclosure.

FIG. 1 shows an exemplary system (100). FIG. 1 includes an exemplary configuration of depth sensors 110 and an exemplary computer system (115). In certain embodiments, one or more computer systems perform one or more steps of one or more methods described or disclosed herein. In certain embodiments, one or more computer systems provide functionality described or shown in this disclosure. In certain embodiments, software configured to be executable running on one or more computer systems performs one or more steps of one or more methods disclosed herein and/or provides functionality disclosed herein. Reference to a computer system may encompass a computing device, and vice versa, where appropriate.

This disclosure contemplates a suitable number of computer systems. As example and not by way of limitation, computer system (115) may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a personal digital assistant (PDA), a server, a tablet computer system, an augmented/virtual reality device, or a combination of thereof. Where appropriate, computer system (115) may include one or more computer systems; be unitary or distributed; span multiple locations; span multiple machines; span multiple data centres; or reside in a cloud, which may include one or more cloud components in one or more networks. Where appropriate, one or more computer systems (115) may perform without substantial spatial or temporal limitation one or more steps of one or more methods described or illustrated herein. As an example, and not by way of limitation, one or more computer systems (115) may perform in real time or in batch mode one or more steps of one or more methods disclosed herein.

The computer system (115) may include a processor unit (160), memory unit (170), data storage (190), a receiving unit (150), and an external communication unit (180).

The processor unit (160) may include hardware for executing instructions, such as those making up a computer program. As an example, and not by way of limitation, to execute instructions, processor unit (160) may retrieve the instructions from an internal register, an internal cache, memory unit (170), or data storage (190); decode and execute them; and then write one or more results to an internal register, an internal cache (not shown), memory unit (170), or data storage (190). The processor unit (160) may include one or more internal caches for data, instructions, or addresses. This disclosure contemplates processor units (160) including a suitable number of suitable internal caches, where appropriate. The processor unit (160) may include one or more instruction caches, one or more data caches, and one or more translation lookaside buffers (TLBs). Instructions in the instruction caches may be copies of instructions in memory unit (170) or data storage (190), and the instruction caches may speed up retrieval of those instructions by processor unit (160).

The memory (170) may include main memory for storing instructions for processor to execute or data for processor to operate on. The computer system (115) may load instructions from data storage (190) or another source (such as, for example, another computer system) to memory unit (170). The processor unit (160) may then load the instructions from memory unit (170) to an internal register or internal cache. To execute the instructions, the processor unit (160) may retrieve the instructions from the internal register or internal cache and decode them. During or after execution of the instructions, the processor unit (160) may write one or more results (which may be intermediate or final results) to the internal register or internal cache. The processor unit (160) may then write one or more of those results to the memory unit (170). The processor unit (160) may execute only instructions in one or more internal registers or internal caches or in the memory unit (170) (as opposed to data storage (190) or elsewhere) and operates only on data in one or more internal registers or internal caches or in memory unit (170) (as opposed to data storage (190) or elsewhere). One or more memory buses may couple processor unit (160) to memory unit (170). The Bus (not shown) may include one or more memory buses. The memory unit (170) may include random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. Memory unit (170) may include one or more memories, where appropriate.

The data storage (190) may include mass storage for data or instructions. The data storage (190) may include a hard disk drive (HDD), flash memory, an optical disc, a magneto-optical disc, magnetic tape, or a Universal Serial Bus (USB) drive or a combination therein. Data storage (190) may include removable or non-removable (or fixed) media, where appropriate. Data storage (190) may be internal or external to computer system, where appropriate. Data storage may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination thereof.

In certain embodiments, I/O interface (not shown) may include hardware, software, or both, providing one or more interfaces for communication between computer system and one or more I/O devices. Computer system may include one or more of these I/O devices, where appropriate. One or more of these I/O devices may enable communication between a person and computer system. An I/O device may include a keyboard, keypad, microphone, monitor, mouse, printer, scanner, speaker, still camera, stylus, tablet, touch screen, trackball, video camera, another suitable I/O device or a combination thereof. An I/O device may include one or more sensors. This disclosure contemplates any suitable I/O devices and any suitable I/O interfaces for them. Where appropriate, I/O interface may include one or more device or software drivers enabling the processor unit (160) to drive one or more of these I/O devices. I/O interface may include one or more I/O interfaces, where appropriate.

Figure 7:
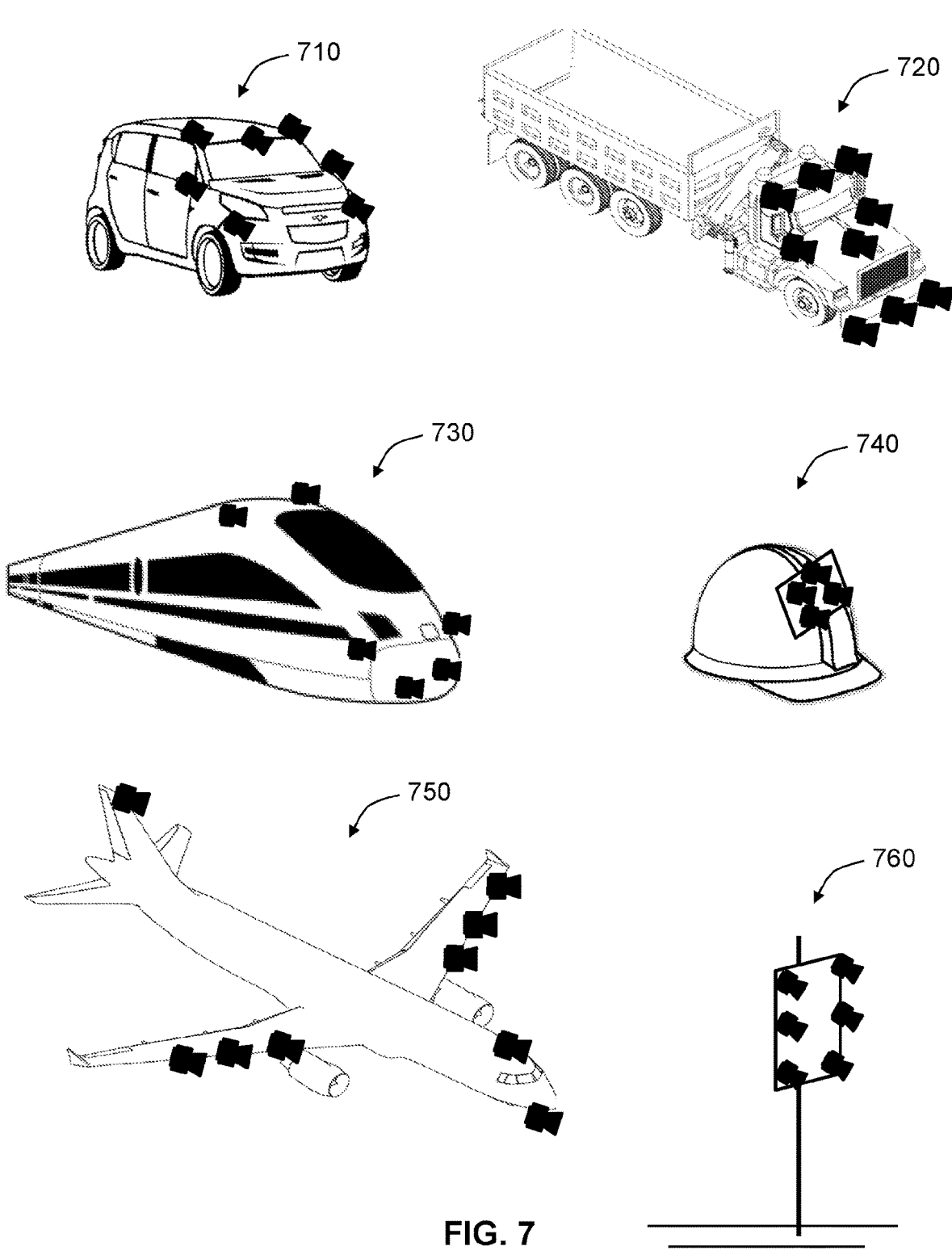
FIG. 7 illustrates some applications and sensor array configurations.
Figure 8:
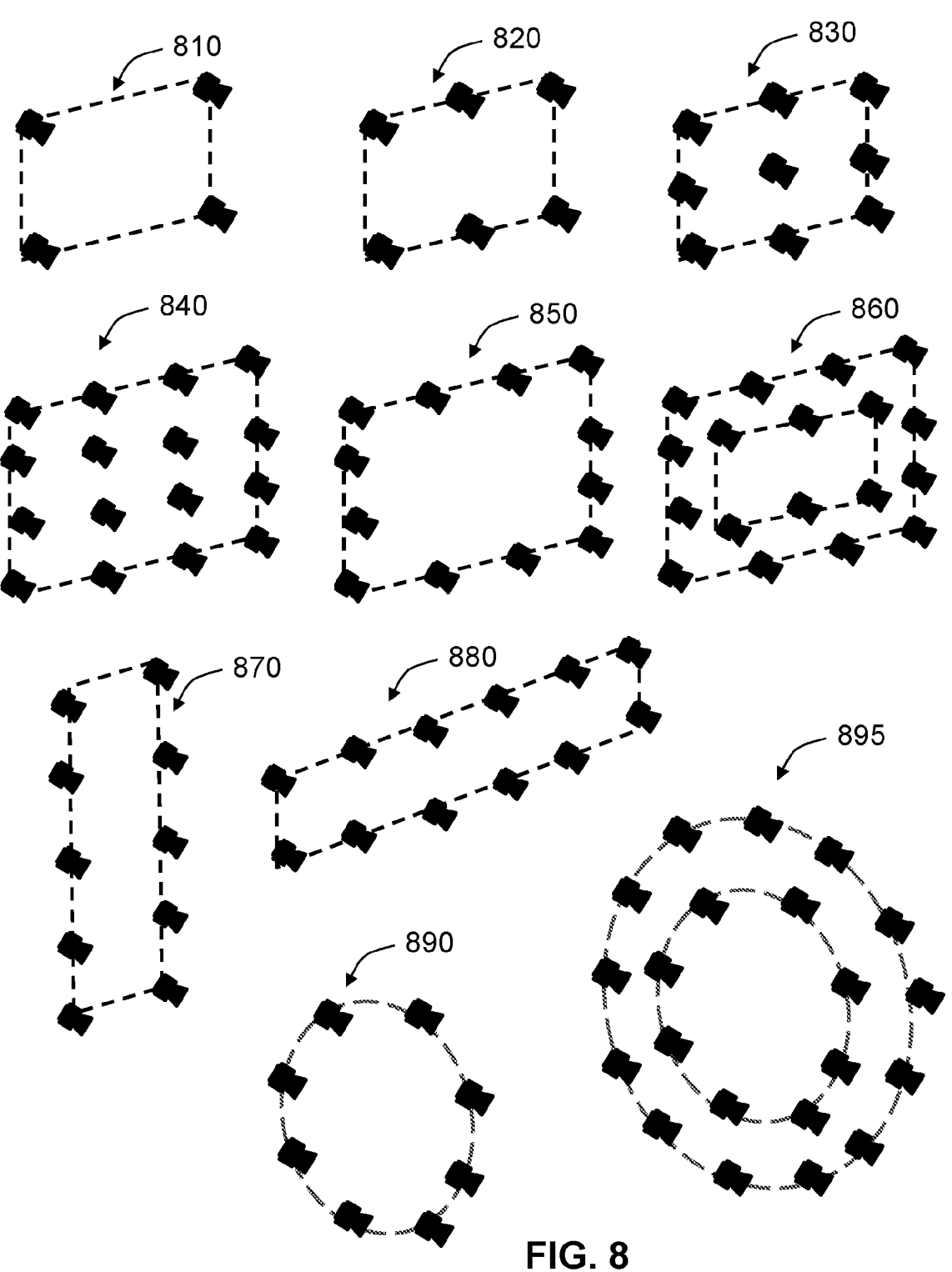
FIG. 8 illustrates some further sensor array configurations.

Although FIG. 1 shows an exemplary configuration of depth sensors other configurations may be used. For example, the sensors may be arranged in a circular pattern, a zigzagged pattern, a scattered pattern, and some of the sensors may be offset in one or more of the three dimensions. To illustrate, FIG. 7 shows depth sensors used in a variety of exemplary situations including on a car 710, on a truck 720, on a train 730, on a helmet 740, on an airplane 750 and on a post 760. And FIG. 8 shows depth sensors in further alternative exemplary configurations including 2×2 rectangle 810, 3×2 rectangle 820, 3×3 rectangle 830, 4×4 rectangle 840, hollow 4×4 rectangle 850, two concentric rectangles 860, a thin vertically posed array 870, a thin horizontally posed array 880, a circle 890, and concentric circles 895. In practice there are few limitations on the configuration of the depth sensors. Additionally, some depth sensors may move relative to each other on articulated parts of the base platform or vehicle. Further, depth sensors may be free to move independently (e.g., mounting one or more on one or more drones) and certain embodiments of this disclosure may still apply as long as the relative positions of the depth sensors are known to acceptable accuracy at the time the depth map or maps are captured.

Exemplary Illustrative Scene

Figure 2:
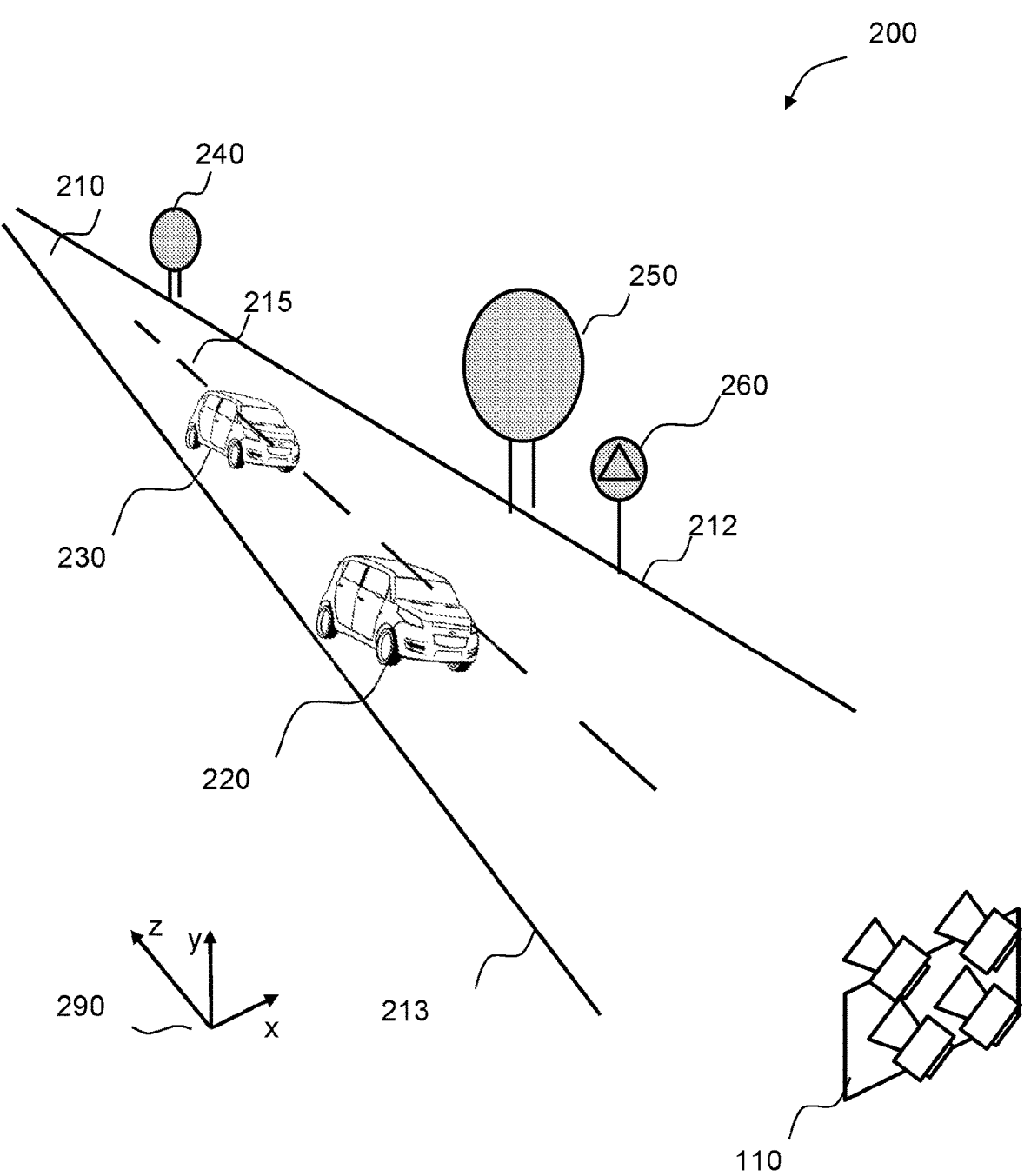
FIG. 2 is an illustration of an exemplary real-world scene observed by a set of sensors.

FIG. 2 shows a scene 200. A road 210 is illustrated with lines 212, 213 marking the edge of the road and marking 215 for the centre line of the road 210. In this scene there are two cars 220, 230 on the road. Also shown are trees 240, 250 and a sign 260, positioned to the side of the road. A sensor array 110 is shown oriented to observe the scene. The sensor array 110 may be located on a vehicle (not shown) and may itself be travelling along the road. Axis 290 indicate reference position and orientation for a 3D co-ordinate system that may be used to describe the locations of objects in the scene.

Exemplary Process for Depth Map Refinement

Figure 3:
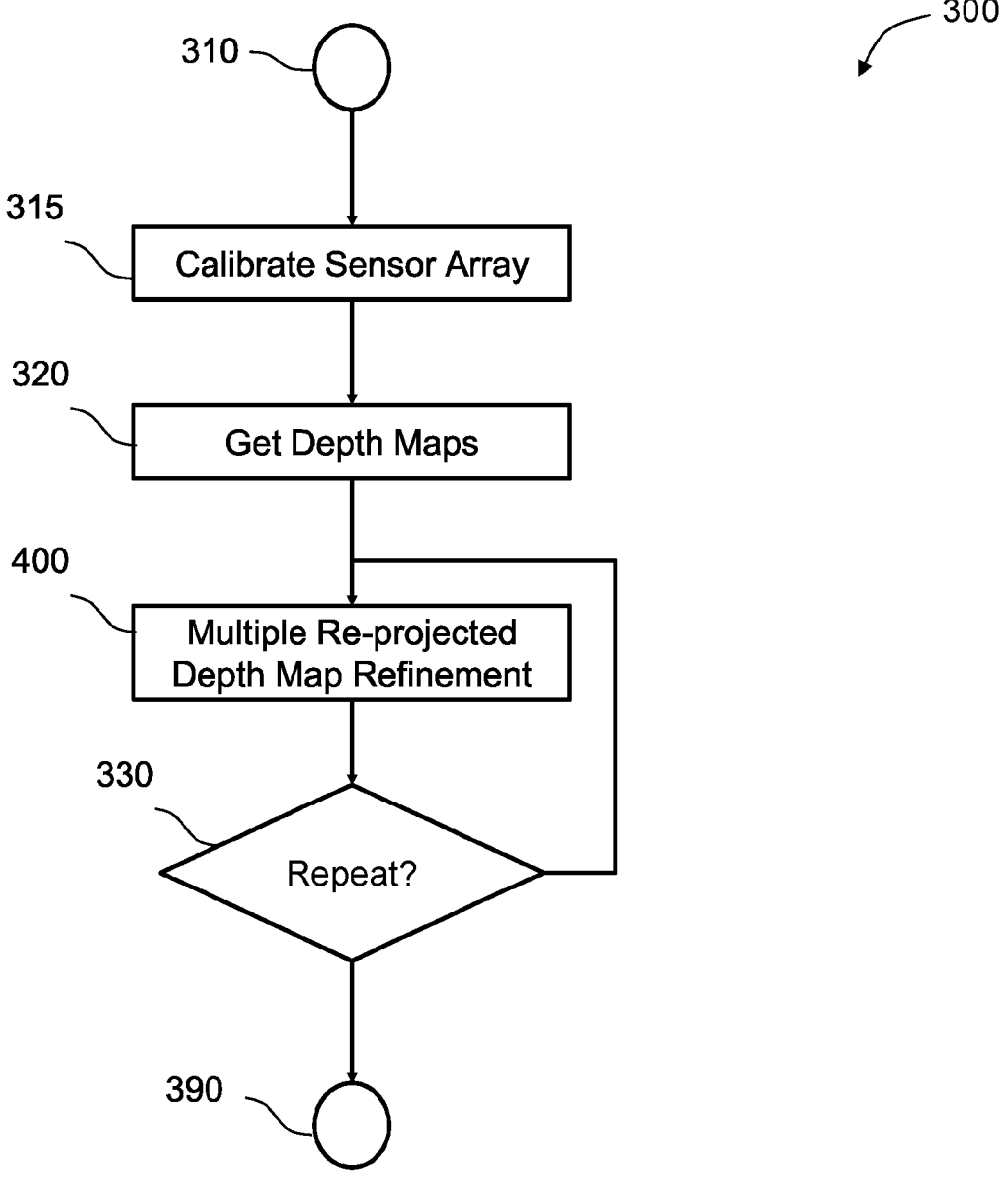
FIG. 3 is a flow chart of an exemplary process.

FIG. 3 shows an exemplary process 300 for combining 3D scene information from multiple 3D sensors. Starting at step 310 the process moves directly to step Calibrate Sensor Array 315. At step Calibrate Sensor Array 315 calibration of the depth sensors (e.g., 120, 130, 140) in the sensor array 110 may be performed so that later steps may operate with depth sensor data that is relative to a shared conceptual origin in 3D. Calibration determines calibration parameters that may describe a mapping between the location of physical surfaces observed by the depth sensor and the corresponding data captured by the depth sensor. Calibration parameters may include intrinsic parameters that describe the mapping intrinsic to that depth sensor, and may include extrinsic parameters that describe the location and orientation of that depth sensor in the scene. In sensor array systems the extrinsic parameters may include information about the location and orientation of the depth sensors with respect to each other. As part of this step the intrinsic depth sensor parameters and/or extrinsic depth sensor parameters of depth sensors in the sensor array 110 may be determined and may be stored for use in later processing steps. Calibration is a known procedure in the art and there are number of methods that may be applied. In certain embodiments, calibration may be a manual process. In certain embodiments, calibration may be an automated process and may be performed by the computer system 115 working in conjunction with the sensor array 110. In certain embodiments, calibration may use test charts or specialised targets with known size and/or configuration. Following step calibrate sensor array 315 the process moves to step Get Depth Maps 320.

At step Get Depth Maps 320 the computer system 115 operates the senor array 110 to capture data and to capture or generate multiple depth maps. Depth maps are further described in elsewhere in this disclosure. The contents and format of the sensor data may vary depending on the type of the depth sensor. A time of flight camera may directly produce a depth map containing image data (e.g., RGB data) and depth information for depth map locations in a 2D grid data structure.

A camera sensor, including infrared sensors (e.g., LWIR, MWIR, SWIR), may not in-of-itself provide depth information. However, a pair or camera sensors or an array of camera sensors may determine 3D information with appropriate processing of the sensor data. The result may be a depth map containing image data (e.g., RGB data) and depth information aligned with image pixels in a similar 2D grid structure.

A Lidar sensor may provide a point cloud as a list or array of 3D locations and intensities. A radar sensor may provide a point cloud as a list or array of 3D locations and intensities. Where the depth sensor provides 3D data as a point cloud the data may be projected on to a 2D conceptual surface located and oriented in the scene to represent the point of view of the depth sensor from the viewpoint of its sensor centre point in 3D. The projection of the data onto the 2D grid thus produced is a depth map structure comparable to that produced by the other sensor types mentioned above.

Depth sensors may output alternative forms of 3D information, for example, a top down 'radar' view with height and intensity recorded at each location into a polar grid. Notwithstanding these various data format differences, the 3D information may be mapped into a depth map, potentially requiring a nominal sensor centre point to be chosen as part of the process. Howsoever these depth maps are produced from the sensor types, the processes and/or systems disclosed herein may then be applied.

There are many types of sensors that may individually or as pairs of sensors or as groups of sensors, generate depth maps. Thus, in step Get Depth Maps 320 it is possible that many depth maps representing the scene from different locations and orientations may be captured or generated. Following the step Get Depth Maps 320 the process moves to the sub-process Multiple Re-projected Depth Map Refinement 400.

At sub-process Multiple Re-projected Depth Map Refinement 400 depth maps captured or generated at step Get Depth Maps 320 may be refined by re-projecting the data of multiple depth maps, determining refined depth values and generating a new set of depth maps with refined 3D information. For certain cells in an input depth map, there may be no depth value or there may be a flag indicating that the depth value is considered uncertain, or alternatively measurements may be tagged with at least one numeric value that represents the degree of uncertainty. Cells flagged as uncertain or with certainty beneath some threshold may be ignored in the reprojection and the subsequent determination of a refined depth value. An effect of the sub-process Multiple Re-projected Depth Map Refinement 400 may be to reduce inconsistencies in the depth maps where data, initially coming from the multiple independent depth maps, initially appears ambiguous or contradictory.

The process of sub-process 400 is described in more detail elsewhere in this disclosure. Following the sub-process Multiple Re-projected Depth Map Refinement 400 the process moves to a decision step Repeat? 330.

At step Repeat? 330 the process may either proceed to step 390 and terminate or may iterate, repeating the sub-process Multiple Re-projected Depth Map Refinement 400. When iterating over the sub-process Multiple Re-projected Depth Map Refinement 400 the sub-process returns a set of updated depth maps and these updated depth maps may then be used as input for the next iteration. By iterating the sub-process Multiple Re-projected Depth Map Refinement 400 a number of times, inconsistencies may be further reduced and the resulting 3D information in the final depth maps may more accurately describe the location of surfaces in the scene than at least one of the original depth maps input into this process. This iterative procedure may be continued until a certain termination condition is reached. This condition may be an observation that the refined depth map data has not changed significantly from one or more previous iterations of the process (i.e., the process has converged on a set of 3D points that may be said to be a stable set under this repeated projection and reprojection procedure). Other termination conditions may be used, for example, when a portion of the 3D points sufficiently closely represent an a-priori known 3D structure in the scene, or there may be a previously determined number of iterations (for example, 1, 2, 5, 10, 100, 1000 or more) that may be performed. For example, in certain embodiments, the previously determined number of iterations may be less then 2, 3, 4, 5, 10, 20, 30, 40, 50, 100, or 500. Howsoever determined, once the iterative process is complete, data from one or more of the refined depth maps and/or the point-cloud that is the projection of the depth maps into the scene may be read and may be output, for example via an External Communications Unit 180.

Exemplary Depth Map Data Structures

Figures 6A, 6B, 6C, 6D:
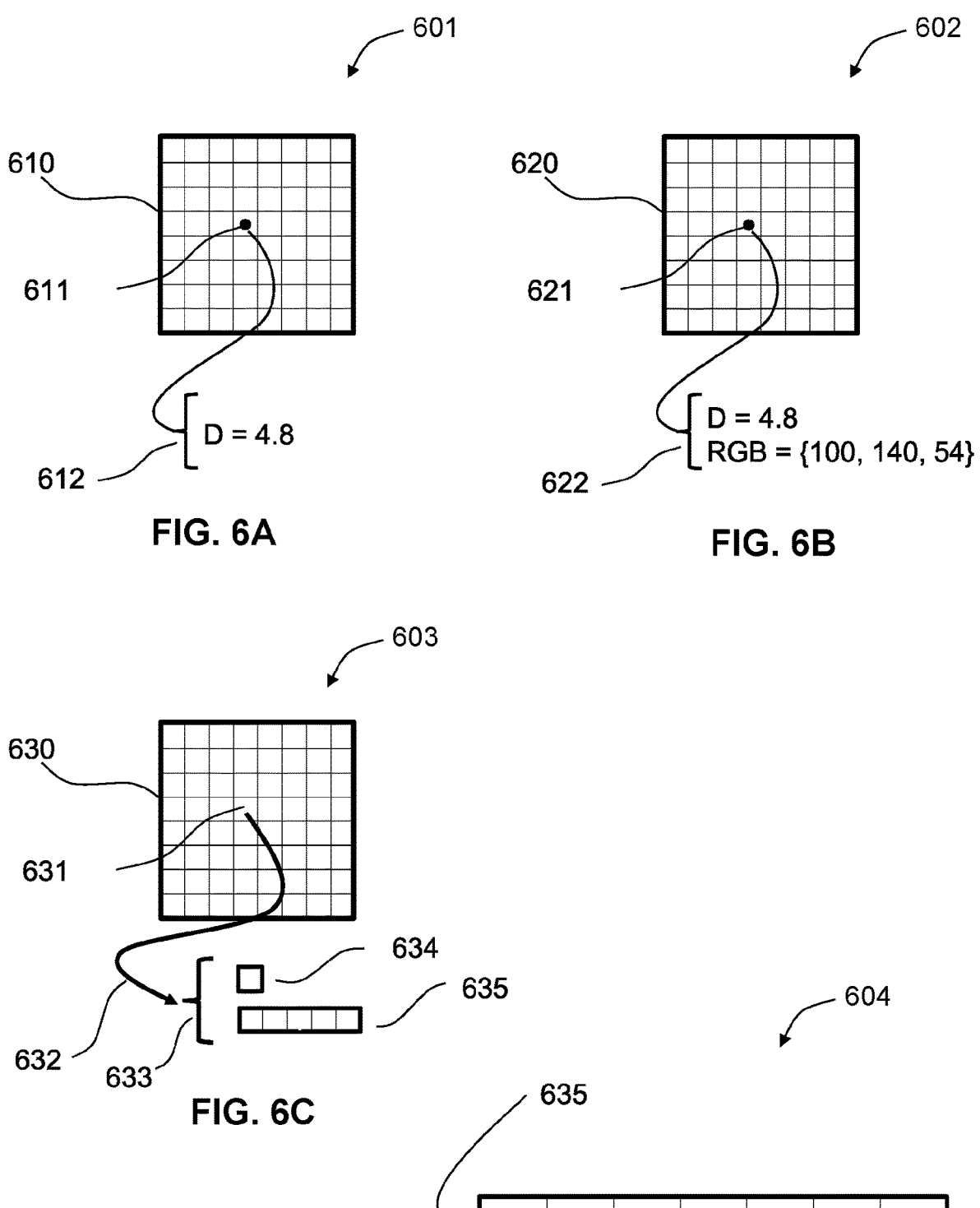
FIGS. 6A-D shows an exemplary data structures suitable for representing multiple data values (e.g., depth measurements), arranged in a grid like a depth map.

In the following, some data structures for storing depth maps are described. Referring to FIG. 6A, at 601 a potential depth map layout is illustrated as a grid 610 of cells including cell 611. The cell 611 contains depth information such as a value for the depth of 4.8 indicated at 612. In an alternative embodiment, see FIG. 6 B, at 602 a depth map is illustrated as a grid 620 of cells including cell 621. The cell 621 contains depth information and RGB colour information as indicated at 622.

In certain embodiments, the depth maps may include a flag or a special value to indicate that the depth for a given cell is not known or is not reliable. Such unreliable depth readings may occur, for example, when a cell corresponds to the boundary of an object in the scene and thus the cell may represent partly the foreground object and partly some other object or background.

In certain embodiments, it is useful to have a depth map that may collect many depth values for a cell. FIG. 6 C shows at 603 a depth map 630 that where cells of the depth map may include a pointer 632 to data structure 633 and the data structure 633 comprises a variable 634 where a refined depth value may be held in memory and a list 635 that may be used to store multiple depth values.

In certain embodiments, in addition to depth data, other data may also be associated with a cell such as colour data, spectral data, velocity data, other data, or combinations thereof that may be provided by a sensor, or other data that might be derived from other processes.

Exemplary Process for Sub-Process Multiple Re-Projected Depth Map Refinement

Figure 4:
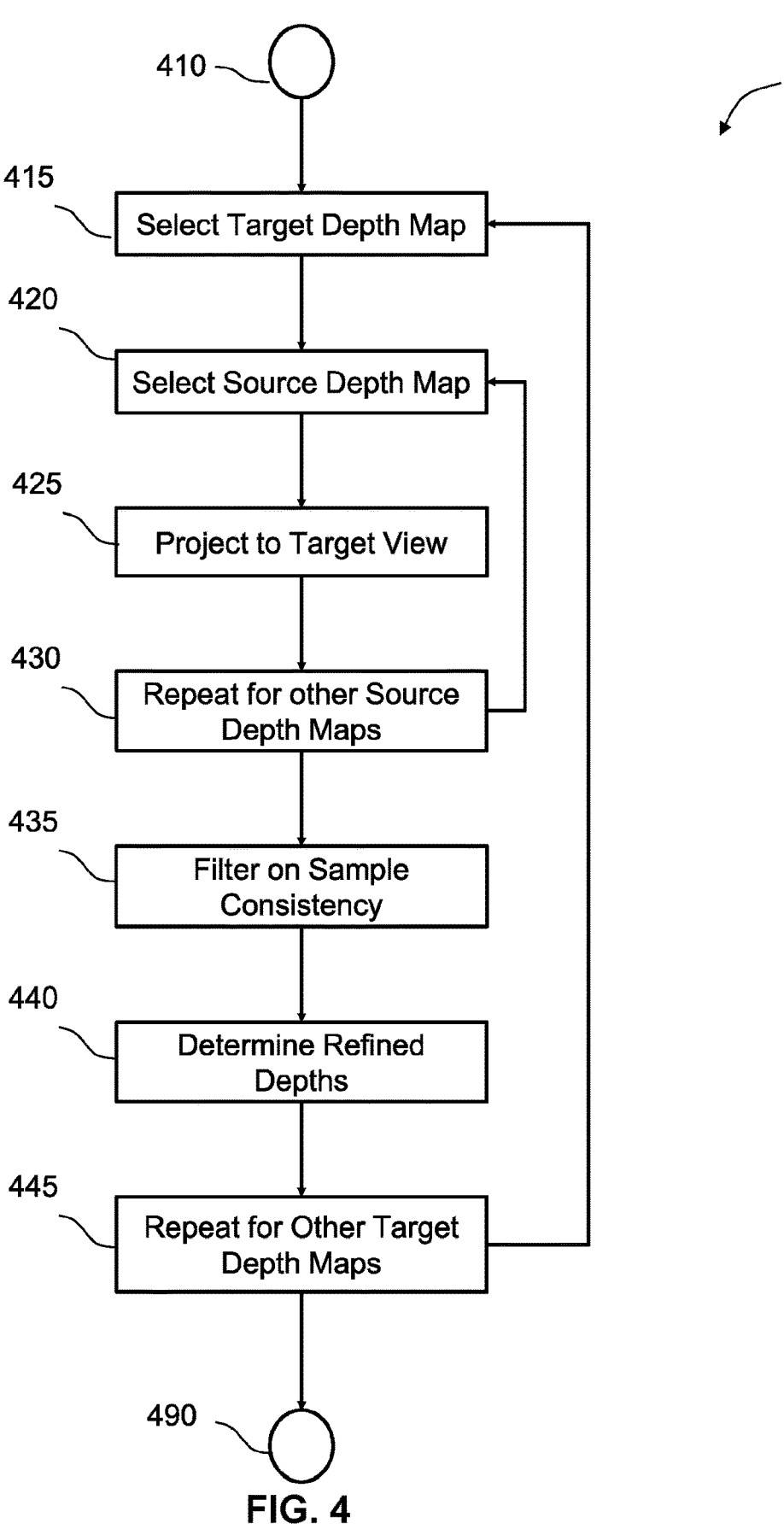
FIG. 4 is a flow chart of the sub-process Multiple Reprojected Depth Map Refinement.

FIG. 4 shows an exemplary sub-process 400 for collectively refining a set of depth maps representing observed views of a scene 200. The process 400 takes a set of depth maps as input, also referred to in this disclosure as source depth maps. Depth maps are described in detail elsewhere in this disclosure.

The source depth maps input into process 400 may be obtained using the depth sensors in the sensor array 110 and may be obtained using depth sensors of the same type or mixtures of different types of depth sensor. The depth maps input into process 300 may represent views of the scene 200, and one or more depth maps may be associated with a sensor viewpoint (i.e., a sensor centre and potentially a view orientation from that point) and may contain 3D scene information about the scene 200 from that point of view. In certain embodiments, at least one of the depth maps input into the process 400 may have substantially the same viewpoint (i.e., location and orientation) as at least one of the depth sensors in the sensor array 110.

The result of the exemplary sub-process 400 may be a set of depth maps derived from the depth maps input into the process. The exemplary sub-process illustrated in FIG. 4, may be repeated as illustrated in the exemplary process set forth in FIG. 3.

In certain embodiments, at least one of the depth maps output from the process 400 may have substantially the same viewpoint (i.e., location and orientation) as at least one of the depth sensors in the sensor array 110.

In certain embodiments, at least one of the depth maps output from the process 400 may have substantially the same viewpoint (i.e., location and orientation) as at least one of the depth maps input into the process 400.

In certain embodiments, at least one of the depth maps output from the process 400 may not have substantially the same viewpoint (i.e., location and orientation) as at least one of the depth sensors in the sensor array 110.

In certain embodiments, at least one of the depth maps output from the process 400 may not have substantially the same viewpoint (i.e., location and orientation) as at least one of the depth maps input into the process 400.

In certain embodiments, the number of depth maps output may be the same as the number of depth maps input to the process 400. This arrangement facilitates repetition of the process of refinement, as the output of one iteration may be used directly as the input to another iteration of the process described up to this point.

In some embodiments, the number of depth maps output is less than or greater than the number of depth maps input to the process. If desired, iterations of the refinement process 400 may continue as long as there is more than one source depth map available as potential input to the refinement process 400. In this circumstance, the refinement process may still be performed and the one or more output refined depth maps may be used as the input to another iteration of the refinement process 400. In addition, if desired, other sources of depth maps may also be used in the refinement process 400.

In certain embodiments, at least one depth map may be output. And this at least one depth map may be output from the computer system 115. And in this arrangement the output may be used as a consolidated representation of a scene.

In this disclosure, the term target depth map is used to describe a depth map that may be written to or updated with data in a current iteration, and the term source depth map is used to describe a depth map that is used as an input during the current iteration.

Process 400 starts at 410 and moves directly to Select Target Depth Map 415. At step Select Target Depth Map 415 a first target depth map viewpoint may be selected from the set of source depth map viewpoints, or from the set of target depth map viewpoints that have been used during previous iterations of the process (see steps 415 to 445). Equally, at step Select Target Depth Map 415 a first target depth map viewpoint may be selected using independent information, even randomly. From Select Target Depth Map 415 the process moves to Select Source Depth Map 420.

Typically, at step 420, the source depth map may be selected from earlier refined depth maps at one or more previous iterations of the process, however, at step 420 it is also possible to select at least in part a depth map produced by one or more of the sensors and/or a depth map provided by some other source. From Select Source Depth Map 415, the process moves to Project to Target View 425.

At step Project to Target View 425 the data in the selected source depth map, representing 3D points from its point of view, may be projected into 3D space and then from 3D space into the selected target depth map using the known sensor centres and projective geometry techniques known in the art (the sensor centres and other information necessary to perform these projections may be determined by the calibration procedure described elsewhere in this disclosure). In some embodiments, unlike the method just described, the projection process from the source depth map to the target depth map may be defined directly (for example, using 3D geometry that is known to one skilled in the art) and thereby avoid explicitly projecting into a 3D space as an interim step. In some embodiments, the projection may be carried out in more than one single step, where at least one of these steps adjust the depth map data so that it represents depth data that would have been captured by a sensor centred at a different location than the original source sensor centre. In some embodiments, a series of transformations that adjust the depth map data as if the sensor centres are in different 3D locations may enable more efficient processing than if the transformations were carried out in one single step, whether or not this single step is achieved by interim projection into 3D space or if the mapping is performed directly from a source depth map to a target depth map.

Figure 5:
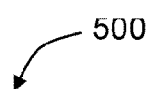
FIG. 5 illustrates conceptually the projection of a source depth map to a target depth map.
Figure 5:
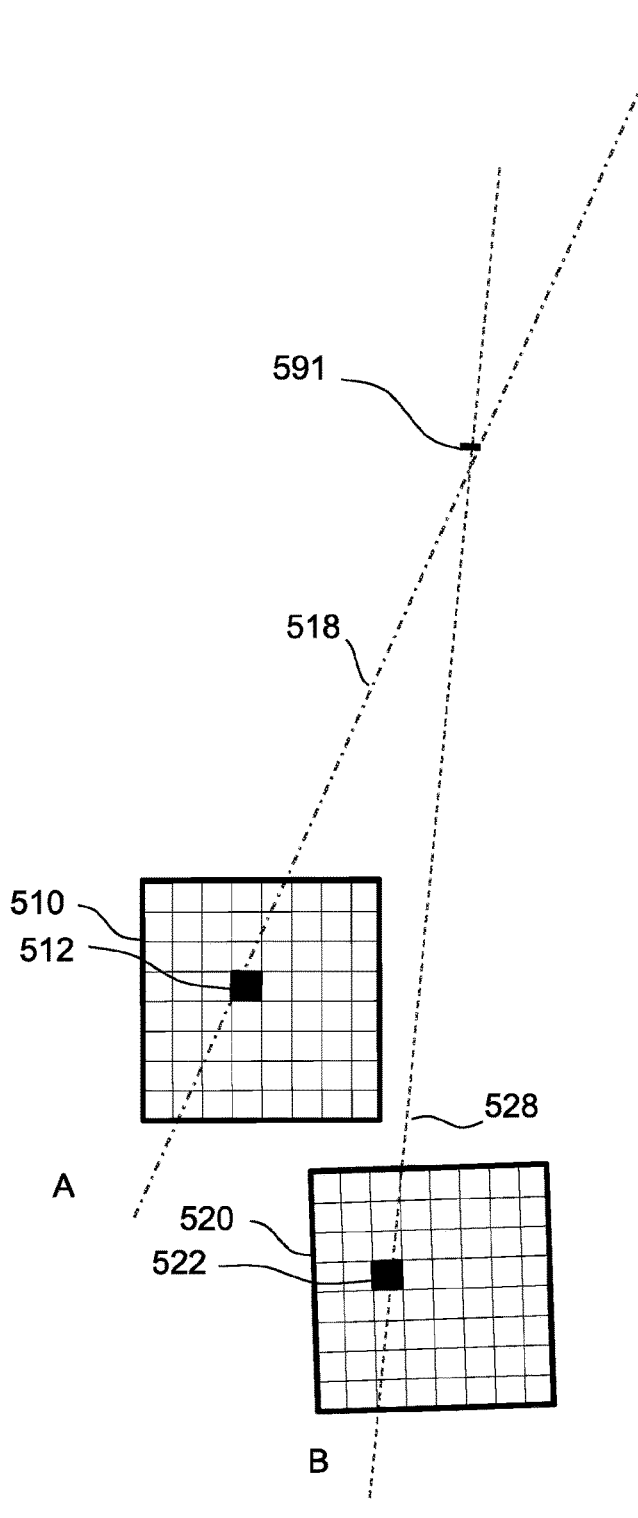

Referring to FIG. 5, a source depth map is shown as a grid of cells at 520. The dashed line 528 which shows conceptually the projection of cell 522 of the source depth map 520 into 3D space, for example, into the space of a scene such as 200, and a mark 591 represents a 3D point according to the value of the cell 522. Thus, in this exemplary, one or more of the cells of the source depth map may represent a 3D point in the scene; i.e., by conceptually constructing a straight line of length specified by the depth value in the cell that passes from the sensor centre through this cell, out into the 3D scene and terminates at the 3D point in the scene being described. Also, in FIG. 5 a target depth map is shown as a grid of cells at 510 with a cell 512 having a projection into 3D space shown as the dot-dash line 518. By calculation of the 3D geometry, considering the location and pose of the view represented by the source depth map 520 and the location and pose of the view represented by the target depth map 510, the distance along 518 that approximates the location of the 3D point at 591 may be calculated. A value of depth for the target depth map 510, for cell 512 may thus be determined from the source depth map 520.

In certain embodiments, the location of 3D points may be calculated from the source depth map. A collection of 3D points may be known as a point cloud (defined elsewhere in this disclosure). From the point cloud the depths of the 3D points in the point cloud with respect to the target depth map may be calculated (by projecting one or more of the 3D points towards the target sensor centre and thereby onto a conceptual image plane of the target sensor). In certain embodiments, the calculation may be performed without determining the coordinates of the 3D points as an interim step, but instead by calculating the value of the depth with respect to the target depth map directly. In certain embodiments, all or part of the 3D projection into the scene followed by re-projection back onto a depth map calculation may be pre-calculated and cached or stored in a suitable format within the processor's memory (exploiting the fact that sensor centres may remain fixed, or substantially fixed, relative to each other and so such 3D mappings may be pre-calculated).

For a cell in the target depth map a data structure may be used to store multiple depth values obtained from the projection of the 3D points from the multiple source depth maps. FIG. 6C shows a depth map 630 where cells of the depth map may include a pointer 632 to data structure 633 and the data structure 633 comprises a variable 634 where a depth value may be held in memory and a list 635 that may be used to store multiple depth values. In certain embodiments, the elements of the list 635 may store additional information such as the colour, spectral data, velocity data or other data associated with samples for a cell.

Values for cells in the target depth map may be derived from the projections from cells in the source depth maps and may be written into the lists in the target depth map, for example 635. FIG. 6D illustrates a list 635 in further detail with example numeric values in the cells. In some cases, a cell in the target depth map may have no values, one or many depth values thus accumulated from one or more source depth maps depending on the contribution of different cells in the source depth maps. In certain embodiments, there may be approximately the same number of depth values stored as there are depth maps chosen from the set of available source depth maps. In certain embodiments, the number of depth values stored may differ from the number of source depth maps.

Following step 425 Project to Target View the process moves to step 430 Repeat for other Source Depth Maps. This step forms a loop iterating over the set of source depth maps. When the set of selected source depth maps have been processed, the control moves to step Filter on Sample Consistency 435. However, if there are more source depth maps to be considered then the process returns to step Select Source Depth Map 420 and another of the source depth maps may be selected and then projected to the target view in step Project to Target View 425 and so on.

At step Filter on Sample Consistency 435, the sample depths determined in step Project to Target View 425 may be evaluated to determine if they represent a set of depth samples that agree within an acceptable numerical threshold, i.e., consistent. The depth values for the samples for a cell may be evaluated and if the range of depth samples is greater than a threshold then the cell of the target depth map may be considered inconsistent. The consistency of range values may be calculated using the robust interquartile range concept, although other methods such as the mean, the trimmed mean, the bootstrapped median as well as techniques that account for the known or estimated accuracy or other associated metadata of at least some of the collected values in the list may be used. In certain embodiments, the depth consistency threshold may be a value of about 1%, 2%, 3%, 4%, 5%, 6%, 8%, 9%, 10% or other value as appropriate for the application. In certain embodiments, the depth consistency threshold may be a value of less than 1%, 2%, 3%, 4%, 5%, 6%, 8%, 9%, 10% or other value as appropriate for the application. In certain embodiments, if a cell is considered inconsistent then the refined depth value may be overwritten with a value of 'none' or some other value recorded to indicate that this refined depth value may be ignored.

In certain embodiments, the known or measured or estimated error characteristics of the depth sensors may be used to establish criteria for determining if the sample depths may be considered inconsistent.

In certain embodiments, the known or measured or estimated error characteristics of the depth sensors of different classes (e.g., Lidar, Radar, stereo cameras, etc) may be used to in combination using known statistical methods to establish criteria for determining if the sample depths may be considered inconsistent.

In certain embodiments, additional data associated with the samples for a cell may be used to determine if the samples represent a consistent set of depth samples. For example, one or more of the following: the colour, spectral data, velocity data and other measures associated with samples for a cell may be evaluated to determine if the samples may be considered consistent.

Following step Filter on Sample Consistency 435 the process moves to step Determine Refined Depths 440. A cell in the target depth map may have zero, one or more depth values stored as may have been derived from the projection of the source depth maps into the target view. If the number of depth values stored is below a minimum number, then a refined depth for the cell of the target depth map may be set to 'none'. However, if the number of depth values is equal or greater than a minimum number then a refined depth value may be determined for the cell from the stored depth values. In certain embodiments, the refined depth value may be one or more of the following: the mean, trimmed mean, mode and median of the stored depth values for the cell, and calculations similar to the consistency processing carried out in the previous step Filter on Sample Consistency 435. In certain embodiments, the refined depth value calculations may be based on, or supplemented by, one or more of the following: colour, spectral data, velocity data, other measures associated with samples for a cell in addition to, or in place of, the depth values. Spectral data, such as RGB data, may be stored with cells in the depth map as shown in FIG. 6B.

In certain embodiments, one or more refined depth values for a cell in the target depth map may be determined based additionally on the stored depth values associated with one or more neighbouring cells in the target depth map.

Howsoever chosen, one or more refined depth values (including, where applicable, flags that indicate "none" i.e., no valid value available) may then be written to the cells of the target depth map.

In certain embodiments, values for colour, spectral data, velocity data, or other metadata may be determined and may also be written to the cells of the target depth map.

Following step 440 Filter on Sample Consistency the process moves to step Repeat for Other Target Depth Maps 445.

At step Repeat for Other Target Depth Maps 445, if there are more target depth maps to be processed, then control moves again to step Select Target Depth Map 445 where the next target depth map may be selected and the process may continue from there. When the target depth maps have been processed control moves to step 490 where the sub-process Multiple Re-projected Depth Map Refinement completes. At this point, a set of target depth maps may have been generated. The set of target depth maps may then be returned to the calling process and control may then return to the calling process.

Further advantages and/or features of the claimed subject matter will become apparent from the following examples describing certain embodiments of the claimed subject matter.

1A. A method of combining depth information collected from at least two source depth maps to produce refined depth information comprising:
  a. providing at least two source depth maps of a scene from at least two points of view and forwarding the provided at least two source depth maps to a computer system configured to:
  b. receive the at least two source depth maps;
  c. select a target viewpoint in order to generate a target depth map;
  d. select at least a first selected location on the target depth map, and locate corresponding locations and depth values in at least two of the source depth maps and by using zero or at least one of the corresponding depth values to determine at least one refined depth value for the first selected location; and
  e. repeat the process in step (d) for at least a substantial portion of locations in the target depth map to determine refined depth values for at least the substantial portion of locations to produce the refined depth information.

2A. A method of combining depth information from at least two depth maps to produce refined depth information comprising:
  a. providing at least two source depth maps of a scene from at least two points of view and forwarding the collected at least two source depth maps to a computer system configured to:
  b. receive the at least two source depth maps;
  c. select a target viewpoint in order to generate a target depth map;
  d. select at least a first selected location on the target depth map, and locate corresponding locations and depth values in at least one of the at least two source depth maps and by using zero or at least one of the corresponding depth values determine at least one refined depth value for the first selected location;
  e. repeat the process in step (d) for at least a substantial portion of locations in the target depth map to determine refined depth values for at least the substantial portion of locations in the target depth map;
  f. repeat steps (c), (d), and (e) to produce at least two refined target depth maps;
  g. repeat steps (b), (c), (d), (e), and (f) using the at least two refined target depth maps as the at least two source depth maps;
  h. repeat step (g) until a termination condition is reached; and
  i. output the refined depth information representative of the scene.

3A. A method of combining depth information collected from at least two depth sensors to produce refined depth information comprising:
  a. generating at least two source depth maps of a scene from at least two points of view from the at least two depth sensors and forwarding the collected at least two source depth maps to a processor configured to:
  b. receive the at least two source depth maps;
  c. select a target viewpoint in order to generate a target depth map;
  d. select at least a first selected location on the target depth map, and locate corresponding locations and depth values in at least two of the source depth maps and by using zero or at least one of the corresponding depth values to determine at least one refined depth value for the first selected location; and
  e. repeat the process in step (d) for at least a substantial portion of locations in the target depth map to determine refined depth values for at least the substantial portion of locations to produce the refined depth information.

4A. A method of combining depth information collected from at least two depth sensors to produce refined depth information comprising:
  a. generating at least two source depth maps of a scene from at least two points of view from the at least two depth sensors and forwarding the collected at least two source depth maps to a processor configured to:
  b. receive the at least two source depth maps;
  c. select a target viewpoint in order to generate a target depth map;
  d. select at least a first selected location on the target depth map, and locate corresponding locations and depth values in at least one of the at least two source depth maps and by using zero or at least one of the corresponding depth values determine at least one refined depth value for the first selected location;
  e. repeat the process in step (d) for at least a substantial portion of locations in the target depth map to determine refined depth values for at least the substantial portion of locations in the target depth map;
  f. repeat steps (c), (d), and (e) to produce at least two refined target depth maps;
  g. repeat steps (b), (c), (d), (e), and (f) using the at least two refined target depth maps as the at least two source depth maps to further improve the accuracy of the at least two refined target depth maps;
  h. repeat step (g) until a termination condition is reached; and
  i. output the refined depth information as one or more of the following: at least one final refined target depth map and at least one point cloud that represents projections of a substantial portion of the data in at least one of the at least two refined target depth maps into a scene, and information representative of the scene that is isomorphic to a depth map, point cloud or surface mesh that may consist at least in part of connected triangles or other geometric models of surfaces in a 3D scene.

5A. The method of examples 1A or 3A, wherein a further step (f) repeats steps (c), (d) and (e) to produce at least two refined target depth maps.

6A. The method of example 5A, wherein a further step (g) repeats steps (b), (c), (d), (e), and (f) using at least two refined target depth maps previously generated as the at least two source depth maps to further improve the accuracy of at least two refined target depth maps newly generated.

7A. The method of example 6A, wherein a further step (h) repeats step (g) until a termination condition is reached.

8A. The method of example 7A, wherein in a further step (i) the method outputs the refined depth information representative of the scene.

9A. The method of any of examples 1A to 8A, wherein at least two depth sensors are used to collect the at least two source depth maps.

10A. The method of any of examples 1A to 9A, wherein at least three depth sensors are used.

11A. The method of any of examples 1A to 10A, wherein at least four depth sensors are used.

12A. The method of any of examples 1A to 11A, wherein at least three source depth maps are generated of the scene from at least three viewpoints.

13A. The method of any of examples 1A to 12A, wherein at least four source depth maps are generated of the scene from at least four viewpoints.

14A. The method of any of examples 1A to 13A, wherein the at least two source depth maps is one or more of the following: the at least two source depth maps; the at least two refined depth maps from a previous iteration; the at least two source maps used in at least one previous iteration; the at least two refined depth maps produced by at least one previous iteration; and one or more additional depth maps that may be available during the current iteration.

15A. The method of any of examples 1A to 14A, wherein the number of target depth maps produced at each iteration is at least two, irrespective of the number of at least two source depth maps.

16A. The method of any of examples 1A to 15A, wherein the number of target depth maps produced in steps c and d of examples 1A, 2A, 3A, or 4A is at least two, irrespective of the number of source depth maps used in an iteration of steps c and d of examples 1A, 2A, 3A or 4A.

17A. The method of any of examples 1A to 16A, wherein the number of target depth maps produced at each iteration is at least three, irrespective of the number of at least two source depth maps.

18A. The method of any of examples 1A to 14A, wherein the number of target depth maps produced in steps c and d of examples 1A, 2A, 3A or 4A is at least three, irrespective of the number of source depth maps used in an iteration of steps c and d of examples 1A, 2A, 3A or 4A.

19A. The method of any of examples 1A to 18A, wherein the at least two source depth maps are subject to a pre-processing step at least one time so that depth information within the at least two source depth maps is transformed to generate transformed depth information that is representative of the at least two depth sensors being in a different location to their actual location in 3D space.

20A. The method of any of examples 1A to 19A, wherein the at least two source depth maps are subject to a pre-processing step at least one time so that depth information within the at least two source depth maps is transformed to generate transformed depth information that is representative of at least one depth map grid aligned to at least one rectangular array.

21A. The method of any of examples 1A to 20A, wherein a robust statistics methodology is used to determine refined depth values.

22A. The method of any of examples 1A to 21A, wherein the determined at least one refined depth value for a location is no value.

23A. The method of any of examples 1A to 22A, wherein portions of the at least one refined depth map have improved accuracy.

24A. The method of any of example 1A to 22A, wherein substantial portions of the at least one refined depth map have improved accuracy.

25A. The method of any of examples 1A to 24A, wherein the target depth maps is selected to have a centre that is substantially coincident with a centre of at least one depth sensor.

26A. The method of any of examples 1A to 25A, wherein the target depth maps is selected to have a centre that is not substantially coincident with any centres of the at least one depth sensor.

27A. The method of any of examples 1A to 26A, wherein at least one of the source depth maps is transformed so that depth information is representative of depth information from a depth sensor whose centre in 3D space is not substantially coincident with any centres of the at least one sensor centre.

28A. The method of any of examples 1A to 26A, wherein at least one of the source depth maps is transformed so that depth information is representative of depth information from a depth sensor whose centre in 3D space is substantially coincident with at least one sensor centre.

29A. The method of any of examples 1A to 28A, wherein the step of determining the at least one refined depth value selects no depth value.

30A. The method of any of examples 1A to 29A, wherein refined depth information includes one or more of the following: data that more closely represents positions of surfaces in the scene; data that more fully covers the surfaces in the scene with more 3D points; and data that more widely covers the scene with 3D points.

31A. The method of any of examples 1A to 30A, wherein the determination of the at least one refined depth value is based on one or more of the following: no value, a value from a corresponding location on one or more source depth maps, a value from earlier refined target depth maps, a value from the refined target depth map being constructed, a value from neighbouring cells on earlier refined depth maps, a value from neighbouring cells on the refined target depth map being constructed, and a value from neighbouring cells on one or more source depth maps.

32A. The method of any of examples 1A to 31A, wherein the determination of the at least one refined depth value is based on values derived from one or more of the following: no value, a value from a corresponding location on one or more source depth maps, a value from earlier refined target depth maps, a value from the refined target depth map being constructed, a value from neighbouring cells on earlier refined depth maps, a value from neighbouring cells on the refined target depth map being constructed, and a value from neighbouring cells on one or more source depth maps.

33A. The method of example 32A, wherein the refined value is determined using one or more of the following processes on corresponding depth data points: the numerical average (mean), a trimmed mean, a median, a trimmed median, a weighted mean, a weighted median, a bootstrapped median, and a bootstrapped mean.

34A. The method of any of examples 1A to 33A, wherein the method is performed on at least 3, 4, 5, 6, 7, 8, 9, or 10 target viewpoints.

35A. The method of any of examples 1A to 34A, wherein the output of the refined depth information is one or more of the following: at least one refined target depth map, at least one point cloud, information representative of the scene that is isomorphic to the refined target depth map, information representative of the scene that is isomorphic to the final refined target depth map, information representative of the scene that is isomorphic to a plurality of refined target depth maps, information representative of the scene that is isomorphic to a plurality of the final refined target depth maps, and a surface mesh that consists at least in part of connected triangles or other geometric models of surfaces in the scene.

36A. One or more computer-readable non-transitory storage media embodying software that is operable when executed to implement any of examples 1A to 35A.

37A. A system comprising: one or more processors; and one or more memories coupled to the one or more processors comprising instructions executable by the one or more processors, the one or more processors being operable when executing the instructions to implement any of examples 1A to 35A.

1B. A method of combining depth information collected from a plurality of sensors comprising:

a. collecting a plurality of depth data values from the plurality of sensors and sending the plurality of depth data values to a processor, wherein the plurality of depth data values comprises at least a first source input depth data value from at least a first depth sensor and at least a second source input depth data value from at least a second depth sensor;

b. projecting the at least first source input depth data value from at least a first input depth sensor to a corresponding first location in at least one other target depth sensor and determining at least a first target sample depth value;

c. projecting the at least second source input depth data value from at least a second input depth sensor to a corresponding second location in the at least one other target depth sensor and determining at least a second target sample depth value;

d. examining a portion of projected values in the at least one other target depth map on a per-location basis determining at least one refined depth value for a substantial portion of examined locations;

e. repeating steps (b), (c), and (d) for more than one location on the at least one other target depth map;

f. repeating step (e) for multiple target depth maps; and g. generating refined depth maps for at least some of these target viewpoints.

1C. A method for combining one or more depth maps, supplied by one or more depth map sensors, comprising:

a. accepting a set of source depth maps supplied by two or more depth map sensors;

b. selecting a target viewpoint in order to generate a target depth map;

c. transforming a substantial portion of depth measurements of at least two source depth maps to generate at least two corresponding transformed depth maps from the at least two source depth maps data with viewpoints substantially aligned with the target viewpoint; and d. determining at least one representative depth value for at least a first selected location on at least one target depth map by locating corresponding locations and depths in the at least two corresponding transformed depth maps and using that depth map data to determine the at least one refined depth value; and e. producing a more refined depth map by repeating step (d) for a substantial portion of locations on the at least one target depth map.

2C. A method for combining one or more depth maps, supplied by one or more depth map sensors, comprising:

a. accepting a set of source depth maps supplied by two or more depth map sensors;

b. selecting a target viewpoint in order to generate a target depth map;

c. transforming a substantial portion of depth measurements of at least two source depth maps to generate a viewpoint substantially aligned with a target viewpoint;

d. selecting at least a first selected location on the target depth map, and locating corresponding locations and depth values in at least two of the source depth maps and by using zero or at least one of the corresponding depth values to determine at least one refined depth value for the first selected location; and e. repeating steps (b), (c), and (d) on a plurality of target viewpoints to generate a plurality of more refined depth maps;

f. repeating step (e) on the plurality of more refined depth maps at least one more time, wherein the plurality of more refined depth maps is treated as a plurality of source depth maps to further improve the accuracy, quality, or combinations thereof;

g. terminating the repeating of step (f) when a termination condition is reached; and h. generating one or more of the following: a set of final depth maps and at least one point cloud that represents projections of the set of final depth maps into a scene.

3C. The method of example 1C, wherein steps (b), (c), (d) and (e) in example 1C are repeated for a plurality of target viewpoints to generate a plurality of more refined depth maps.

4C. The method of examples 1C or 2C, wherein the viewpoints are selected from the viewpoints of the one or more of the original depth map sensors, selected from arbitrary locations in 3D space, or combinations thereof.

5C. The method of any of examples 10 to 4C, wherein the plurality of more refined depth maps is treated as a plurality of source depth maps and steps (b), (c), (d) and (e) of example 1C are repeated at least one more time to generate one or more further refined depth maps.

6C. The method of any of examples 1C to 5C, wherein the plurality of more refined depth maps is treated as a plurality of source depth maps and steps (b), (c), (d) and (e) of example 1C are repeated at least one more time to further improve the accuracy, density, quality, or combinations thereof.

7C. The method of any of the examples 1C to 6C, wherein the steps (b), (c), (d) and (e) of example 10 are repeated and terminated when a termination condition is reached.

8C. The method of any of the examples 1C to 7C, wherein one or more of the following is generated: a set of final depth maps, at least one point cloud that is created by projecting the set of final depth maps into the scene, and at least one point cloud that is created by projecting a plurality of depth measurements from at least one of the final depth maps into the scene.

9C. The method of any of examples 10 to 8C, wherein the plurality of more refined depth maps is treated as a plurality of source depth maps and steps (b), (c), (d) and (e) of example 1C are repeated at least one more time to further improve the accuracy, density, quality, or combinations thereof of one or more further refined depth maps.

1D. A system that is configured to combine one or more depth maps, comprising:
   a. a set of at least two source depth maps;
   b. a computer system that is configured to:
   c. accept a set of the at least source depth maps;
   d. select a target viewpoint in order to generate a target depth map;
   e. transform a substantial portion of depth measurements of the at least two source depth maps to generate first source input depth data; and
   f. select at least a first selected location on the target depth map, and locate corresponding locations and depth values in the at least two source depth maps and by using zero or at least one of the corresponding depth values to determine at least one refined depth value for the first selected location.

2D. A system that is configured to combine one or more depth maps, comprising:
   a. a set of at least two source depth maps;
   b. a computer system that is configured to:
   c. accept a set of at least two source depth maps;
   d. select a target viewpoint in order to generate a target depth map;
   e. transform a substantial portion of depth measurements of the at least two source depth maps to generate first source input depth data;
   f. select at least a first selected location on the target depth map, and locate corresponding locations and depth values in the at least two source depth maps and by using zero or at least one of the corresponding depth values to determine at least one refined depth value for the first selected location; and;
   g. repeat steps (d), (e), and (f) for a plurality of target viewpoints to generate a plurality of more refined depth maps;
   h. repeat step (g) on the plurality of more refined depth maps at least one more time, wherein the plurality of more refined depth maps is treated as a plurality of source depth maps to further improve the accuracy, density, quality, or combinations thereof; and
   i. terminate the repeating of step (g) when a termination condition is reached.

3D. A system that is configured to combine one or more depth maps, comprising:
   a. one or more depth map sensors, the one or more depth map sensors are configured to generate a set of source depth maps supplied by two or more depth map sensors;
   b. a computer system that is configured to:
   c. accept a set of source depth maps supplied by two or more depth map sensors;
   d. select a target viewpoint in order to generate a target depth map;

e. transform a substantial portion of depth measurements of at least two source depth maps to generate first source input depth data; and
   f. select at least a first selected location on the target depth map, and locate corresponding locations and depth values in at least two of the source depth maps and by using zero or at least one of the corresponding depth values to determine at least one refined depth value for the first selected location.

4D. A system that is configured to combine one or more depth maps, comprising:
   a. one or more depth map sensors, the one or more depth map sensors are configured to generate a set of source depth maps supplied by two or more depth map sensors;
   b. a computer system that is configured to:
   c. accept a set of source depth maps supplied by two or more depth map sensors;
   d. select a target viewpoint in order to generate a target depth map;
   e. transform a substantial portion of depth measurements of at least two source depth maps to generate first source input depth data;
   f. select at least a first selected location on the target depth map, and locate corresponding locations and depth values in at least two of the source depth maps and by using zero or at least one of the corresponding depth values to determine at least one refined depth value for the first selected location; and;
   g. repeat steps (d), (e), and (f) for a plurality of target viewpoints to generate a plurality of more refined depth maps;
   h. repeat step (g) on the plurality of more refined depth maps at least one more time, wherein the plurality of more refined depth maps is treated as a plurality of source depth maps to further improve the accuracy, density, quality, or combinations thereof; and
   i. terminate the repeating of steps (h) when a termination condition is reached.

5D. The system of examples 1D or 2D, wherein the system further comprises one or more depth map sensors, and the one or more depth map sensors are configured to generate a set of at least two source depth maps.

6D. One or more computer-readable non-transitory storage media embodying software that is operable when executed to implement the systems in any of examples 1D to 5D.

7D. A system comprising: one or more processors; and one or more memories coupled to the one or more processors comprising instructions executable by the one or more processors, the one or more processors being operable when executing the instructions to implement any of examples 1D to 5D.

8D. The system of any of examples 10 to 5D, wherein the system is configured to execute any of the method examples 1A to 34A.

1E. A method of combining depth information collected from at least two depth sensors comprising:
   a. generating at least two source depth maps of a scene from at least two points of view from the at least two depth sensors and forwarding the collected at least two source depth maps to a processor configured to:
   b. receive the at least two source depth maps;
   c. project the collected at least two source depth maps into a point cloud;

d. generate at least one refined target depth map from the point cloud, and for a first selected allocation on the at least one refined target depth map locate corresponding points from the point cloud that projects to this location in the target depth map and by considering the depth measurements of at least one of these corresponding points from the point of view of the target depth map determine at least one refined depth value for the first selected location on the target depth map; and e. repeat the process in step d for at least a substantial portion of points located in the at least one target depths map to determine representative point depth values for at least the substantial portion of locations and generate at least one further refined target depth map.

2E. A method of combining depth information collected from at least two depth sensors comprising:

a. generating at least two source depth maps of a scene from at least two points of view from the at least two depth sensors and forwarding the collected at least two source depth maps to a processor configured to:

b. receive the at least two source depth maps;

c. project the collected at least two source depth maps into a point cloud;

d. project at a least a portion of the point cloud onto at least one target depth map and for a first selected location on the at least one target depth map locate corresponding points from the point cloud that projects to the first selected location in the at least one target depth map and by using the depth measurements of the corresponding points determine at least one refined depth value for the first selected location on the target depth map;

e. repeat the process in step d for at least a substantial portion of locations in the at least one target depth map to determine refined depth values for at least the substantial portion of locations and generate at least one further refined target depth map;

f. repeating steps (b), (c), (d) and (e) to further improve the accuracy of the refined depth values and terminate the repeating of steps (b), (c), (d) and (e) when a termination condition is reached; and g. generating at least two further refined depth map comprising refined depth information; and optionally, the refined depth information contained in the at least one further refined depth map is used to generate a scene point cloud that is representative of the scene.

Any description of prior art documents herein, or statements herein derived from or based on those documents, is not an admission that the documents or derived statements are part of the common general knowledge of the relevant art.

While certain embodiments have been shown and described herein, it will be obvious to those skilled in the art that such embodiments are provided by way of example only.

In the foregoing description of certain embodiments, specific terminology has been resorted to for the sake of clarity. However, the disclosure is not intended to be limited to the specific terms so selected, and it is to be understood that a specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It is to be understood that the present disclosure is not limited to the disclosed embodiments, and is intended to cover various modifications and equivalent arrangements included within the spirit and scope of the present disclosure. Also, the various embodiments described above may be implemented in conjunction with other embodiments, e.g., aspects of one embodiment may be combined with aspects of another embodiment to realize yet other embodiments. Further, independent features of a given embodiment may constitute an additional embodiment. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

What is claimed is:

1. A method of combining depth information from at least two depth maps to produce refined depth information comprising:

a. providing at least two source depth maps of a scene from at least two points of view and forwarding the at least two source depth maps to a computer system configured to:

b. receive the at least two source depth maps;

c. select a target viewpoint in order to generate a target depth map;

d. select at least a first selected location on the target depth map, and locate corresponding locations and depth values in at least one of the at least two source depth maps and by using zero or at least one of the corresponding depth values determine at least one refined depth value for the first selected location;

e. repeat the process in step (d) for at least a substantial portion of locations in the target depth map to determine refined depth values for at least the substantial portion of locations in the target depth map;

f. repeat steps (c), (d), and (e) to produce at least two refined target depth maps;

g. repeat steps (b), (c), (d), (e), and (f) using the at least two refined target depth maps as the at least two source depth maps to further improve the at least two refined target depth maps;

h. repeat step (g) until a termination condition is reached; and i. output the refined depth information representative of the scene.

2. The method of claim 1, wherein at least two depth sensors are used to collect the at least two source depth maps.

3. The method of claim 1, wherein at least three depth sensors are used.

4. The method of claim 1, wherein at least four depth sensors are used.

5. The method of claim 1, wherein at least three source depth maps are generated of the scene from at least three viewpoints.

6. The method of claim 1, wherein at least four source depth maps are generated of the scene from at least four viewpoints.

7. The method of claim 1, wherein the at least two source depth maps is one or more of the following: the at least two source depth maps; the at least two refined target depth maps from a previous iteration; the at least two source depth maps used in at least one previous iteration; the at least two refined target depth maps produced by at least one previous iteration; and one or more additional depth maps available during a current iteration.

8. The method of claim 1, wherein a number of target depth maps produced at each iteration is at least two, irrespective of a number of at least two source depth maps.

9. The method of claim 1, wherein a number of target depth maps produced in steps (c) and (d) of claim 1 is at least two, irrespective of a number of source depth maps used in an iteration of said steps (c) and (d).

10. The method of claim 2, wherein the at least two source depth maps are subject to a pre-processing step at least one time so that depth information within the at least two source depth maps is transformed to generate transformed depth information that is representative of the at least two depth sensors being in a different location to their actual location in 3D space.

11. The method of claim 1, wherein the determined at least one refined depth value for a location is no value.

12. The method of claim 1, wherein portions of at least one of the at least two refined target depth maps have an improved accuracy.

13. The method of claim 1, wherein substantial portions of at least one of the at least two refined target depth maps have an improved accuracy.

14. The method of claim 1, wherein the target depth map is selected to have a centre that is substantially coincident with a centre of at least one depth sensor.

15. The method of claim 14, wherein the target depth map is selected to have a centre that is not substantially coincident with any centres of the at least one depth sensor.

16. The method of claim 1, wherein at least one of the source depth maps is transformed so that depth information is representative of depth information from a depth sensor whose centre in 3D space is not substantially coincident with any centres of at least one sensor centre.

17. The method of claim 1, wherein at least one of the source depth maps is transformed so that depth information is representative of depth information from a depth sensor whose centre in 3D space is substantially coincident with at least one sensor centre.

18. The method of claim 1, wherein the determination of the at least one refined depth value is based on one or more of the following: no value, a value from a corresponding location on one or more source depth maps, a value from earlier refined target depth maps, a value from the refined target depth map being constructed, a value from neighbouring cells on earlier refined depth maps, a value from neighbouring cells on the refined target depth map being constructed, and a value from neighbouring cells on one or more source depth maps.

19. The method of claim 18, wherein the at least one refined depth value is determined using one or more of the following processes on corresponding depth data points: a numerical average (mean), a trimmed mean, a median, a trimmed median, a weighted mean, a weighted median, a bootstrapped median, and a bootstrapped mean.

20. The method of claim 1, wherein the output of the refined depth information is one or more of the following: at least one refined target depth map, at least one point cloud, information representative of the scene that is isomorphic to the refined target depth map, information representative of the scene that is isomorphic to a final refined target depth map, information representative of the scene that is isomorphic to a plurality of refined target depth maps, information representative of the scene that is isomorphic to a plurality of the final refined target depth maps, and a surface mesh that consists at least in part of connected triangles or other geometric models of surfaces in the scene.

21. One or more computer-readable non-transitory storage media embodying software that is operable when executed to implement claim 1.

* * * * *